(12) United States Patent
Tang et al.

(10) Patent No.: US 11,346,995 B2
(45) Date of Patent: May 31, 2022

(54) BACKLIGHT MODULE, METHOD FOR MANUFACTURING SAME, METHOD FOR CONTROLLING SAME, AND DISPLAY APPARATUS

(71) Applicants: Hefei BOE Optoelectronics Technology Co., Ltd., Anhui (CN); BOE Technology Group Co., Ltd., Beijing (CN)

(72) Inventors: Hai Tang, Beijing (CN); Liang Gao, Beijing (CN)

(73) Assignees: Hefei BOE Optoelectronics Technology Co., LTD., Anhui (CN); BOE Technology Group Co., LTD., Beijing (CN)

(*) Notice: Subject to any disclaimer, the term of this patent is extended or adjusted under 35 U.S.C. 154(b) by 0 days.

(21) Appl. No.: 16/967,438

(22) PCT Filed: Dec. 13, 2019

(86) PCT No.: PCT/CN2019/125318
§ 371 (c)(1),
(2) Date: Aug. 5, 2020

(87) PCT Pub. No.: WO2020/192186
PCT Pub. Date: Oct. 1, 2020

(65) Prior Publication Data
US 2021/0239896 A1  Aug. 5, 2021

(30) Foreign Application Priority Data

Mar. 28, 2019  (CN) .......................... 201910244172.6

(51) Int. Cl.
*F21V 8/00* (2006.01)

(52) U.S. Cl.
CPC ............ *G02B 6/0038* (2013.01); *G02B 6/005* (2013.01); *G02B 6/0033* (2013.01); *G02B 6/0076* (2013.01)

(58) Field of Classification Search
CPC .. G02B 6/0038; G02B 6/0076; G02B 6/0033; G02B 6/0035; G02B 6/0036; G02B 6/005; G02B 6/0056
(Continued)

(56) References Cited

U.S. PATENT DOCUMENTS 5,396,350 A * 3/1995 Beeson ................ G02B 6/0053
349/62
5,956,107 A    9/1999 Hashimoto et al.
(Continued)

FOREIGN PATENT DOCUMENTS

CN      1987606 A      6/2007
CN    104880760 A      9/2015
(Continued)

OTHER PUBLICATIONS

International search report of PCT application No. PCT/CN2019/125318 dated Mar. 13, 2020.
(Continued)

*Primary Examiner* — Laura K Tso
(74) *Attorney, Agent, or Firm* — Fay Sharpe LLP

(57) ABSTRACT

A backlight module includes a first light source, a first light guide plate, and an anti-peeping component, wherein the first light source is an edge-type light source of the first light guide plate, the first light guide plate is provided with a light emitting surface and a backlight surface that are opposite, wherein the anti-peeping component is on the light emitting surface, a refractive index of a dielectric in contact with the backlight surface is less than a refractive index of the first light guide plate; the anti-peeping component includes anti-
(Continued)

peeping structures that is provided with a first surface proximal to the first light guide plate, a second surface distal from the first light guide plate, and two opposite third surfaces intersecting both the first surface and the second surface, an included angle between the third surface and the first surface being an obtuse angle.

18 Claims, 15 Drawing Sheets

(58) Field of Classification Search
USPC .................. 362/606, 618, 627, 628, 629
See application file for complete search history.

(56) References Cited

U.S. PATENT DOCUMENTS

| | | | | |
|---|---|---|---|---|
| 8,956,038 | B2* | 2/2015 | Kusuura | G02B 6/0048 |
| | | | | 362/616 |
| 9,885,821 | B2 | 2/2018 | Ma et al. | |
| 2010/0208497 | A1* | 8/2010 | Song | G02B 6/0035 |
| | | | | 362/619 |
| 2012/0069550 | A1 | 3/2012 | Tung et al. | |
| 2015/0346417 | A1* | 12/2015 | Powell | G02B 6/0046 |
| | | | | 362/607 |
| 2016/0216433 | A1* | 7/2016 | Lee | G02B 6/0076 |
| 2016/0349438 | A1* | 12/2016 | Ma | G02B 6/0036 |
| 2017/0139101 | A1* | 5/2017 | Lee | G02B 6/0055 |
| 2018/0059450 | A1 | 3/2018 | Li | |
| 2018/0149789 | A1* | 5/2018 | Choi | G02B 6/0076 |
| 2018/0203299 | A1* | 7/2018 | Wang | G02F 1/133606 |
| 2018/0321523 | A1* | 11/2018 | Robinson | G02F 1/133602 |
| 2020/0012129 | A1* | 1/2020 | Wu | G02B 6/0036 |
| 2020/0019020 | A1* | 1/2020 | Tang | G02B 6/0036 |
| 2020/0089058 | A1* | 3/2020 | Gao | G02F 1/133603 |

FOREIGN PATENT DOCUMENTS

| | | |
|---|---|---|
| CN | 105487292 A | 4/2016 |
| CN | 206057732 U | 3/2017 |
| CN | 106597599 A | 4/2017 |
| CN | 106802499 A | 6/2017 |
| CN | 108508509 A | 9/2018 |
| CN | 207946547 U | 10/2018 |
| CN | 108845458 A | 11/2018 |
| CN | 108957861 A | 12/2018 |
| CN | 109870836 A | 6/2019 |
| JP | 2008077946 A | 4/2008 |
| TW | 449671 B | 8/2001 |
| WO | WG2017215193 A1 | 12/2017 |

OTHER PUBLICATIONS

First office action of Chinese application No. 201910244172.6 dated Apr. 24, 2020.

* cited by examiner

BACKLIGHT MODULE, METHOD FOR MANUFACTURING SAME, METHOD FOR CONTROLLING SAME, AND DISPLAY APPARATUS

CROSS-REFERENCE TO RELATED APPLICATION

The present disclosure is a 371 application based on PCT/CN2019/125318, filed on Dec. 13, 2020, which claims priority to Chinese Patent Application No. 201910244172.6, filed on Mar. 28, 2019, and titled "BACKLIGHT MODULE, METHOD FOR MANUFACTURING SAME, DISPLAY APPARATUS, AND METHOD FOR CONTROLLING SAME", the entire contents of which are incorporated herein by reference.

TECHNICAL FIELD

The present disclosure relates to a backlight module, a method for manufacturing same, a method for controlling same, and a display apparatus.

BACKGROUND

With the development of display technologies and increasing requirements for personal privacy protection, anti-peeping requirements of display apparatuses become higher and higher. A liquid crystal display apparatus is a widely used display apparatus, and includes a backlight module and a display panel. For the liquid crystal display apparatus, the anti-peeping display function is usually implemented from the backlight module.

SUMMARY

The present disclosure provides a backlight module, a method for manufacturing same, a method for controlling same, and a display apparatus. Technical solutions of the present disclosure are as follows:

In one aspect, a backlight module is provided. The backlight module includes:

a first light source, a first light guide plate, and an anti-peeping component; wherein the first light source is an edge-type light source of the first light guide plate;

the first light guide plate is provided with a light emitting surface and a backlight surface that are opposite, wherein both the light emitting surface and the backlight surface are flat surfaces, the anti-peeping component is on the light emitting surface of the first light guide plate, and a refractive index of a dielectric in contact with the backlight surface of the first light guide plate is less than a refractive index of the first light guide plate; and the anti-peeping component includes an anti-peeping layer including a plurality of anti-peeping structures, wherein the plurality of anti-peeping structures are arranged in multiple columns of an array, the anti-peeping structure is provided with a first surface proximal to the first light guide plate, a second surface distal from the first light guide plate, and two opposite third surfaces intersecting both the first surface and the second surface, an included angle between the third surface and the first surface being an obtuse angle, and the second surface being a free-form surface.

Optionally, the first surface satisfies one of the following:

the first surface is provided with a recess region and a flat region; and the first surface is a serrated surface.

Optionally, the anti-peeping structure is further provided with two parallel end surfaces, wherein the end surfaces are in contact with each of the first surface, the second surface, and the two third surfaces.

Optionally, the anti-peeping structure satisfies one of the following:

The anti-peeping structure is strip-shaped, and each column of the anti-peeping layer is provided with one of the anti-peeping structures; and the anti-peeping structure is block-shaped, and each column of the anti-peeping layer is provided with a plurality of the anti-peeping structures.

Optionally, the anti-peeping component further includes: a connection layer on the anti-peeping layer, wherein the plurality of anti-peeping structures are inlaid in the connection layer.

Optionally, the anti-peeping structure is strip-shaped, and the connection layer includes a plurality of connecting strips extending in a same direction, wherein the plurality of connecting strips are arranged in an array, each of the connecting strips intersecting the plurality of anti-peeping structures.

Optionally, the first surface is provided with a recess region and a flat region, and orthographic projections of the connecting strips on the anti-peeping layer fall within the recess region.

Optionally, the anti-peeping component further includes: a filling layer, wherein the filling layer is on one of the position:

a side, distal from the anti-peeping layer, of the connection layer, and a side, distal from the connection layer, of the anti-peeping layer;

a refractive index of the filling layer is less than the refractive index of the first light guide plate.

Optionally, the anti-peeping component further includes: a substrate layer, wherein the anti-peeping layer and the connection layer are sequentially on the substrate layer, the substrate layer is attachable on the light emitting surface of the first light guide plate by an optical adhesive, and refractive indexes of the substrate layer, the optical adhesive, and the first light guide plate are equal.

Optionally, the backlight module further includes:

a second light source, a second light guide plate, and a dielectric layer, wherein the second light source is an edge-type light source of the second light guide plate;

the second light guide plate is provided with a light emitting surface and a backlight surface that are opposite, wherein the light emitting surface is a flat surface, the backlight surface is a dot pattern surface, the second light guide plate is on a side, distal from the anti-peeping component, of the first light guide plate, the light emitting surface of the second light guide plate is proximal to the first light guide plate, and the backlight surface of the second light guide plate is distal from the first light guide plate; and the dielectric layer is between the first light guide plate and the second light guide plate, and a refractive index of the dielectric layer is less than both the refractive index of the first light guide plate and a refractive index of the second light guide plate.

Optionally, the backlight module further includes:

a side reflective layer on a side surface of the first light guide plate, wherein the side reflective layer is opposite to the first light source; and a bottom reflective layer on the backlight surface of the second light guide plate.

In another aspect, a method for manufacturing a backlight module is provided. The method includes:

manufacturing a first light source and a first light guide plate, wherein the first light guide plate is provided with a light emitting surface and a backlight surface that are opposite, and both the light emitting surface and the backlight surface being flat surfaces;

manufacturing an anti-peeping component, wherein the anti-peeping component includes an anti-peeping layer including a plurality of anti-peeping structures, wherein the plurality of anti-peeping structures are arranged in multiple columns of an array, the anti-peeping structure is provided with a first surface and a second surface that are opposite, and two opposite third surfaces intersecting both the first surface and the second surface, an included angle between the third surface and the first surface being an obtuse angle, and the second surface being a free-form surface;

disposing the anti-peeping component on the light emitting surface of the first light guide plate, wherein the first surface of the anti-peeping structure is proximal to the first light guide plate, and the second surface is distal from the first light guide plate; and setting the first light source as an edge-type light source of the first light guide plate, to obtain the backlight module, wherein a refractive index of a dielectric, in the backlight module, in contact with the backlight surface of the first light guide plate is less than a refractive index of the first light guide plate.

Optionally, the anti-peeping component further includes a connection layer; and manufacturing the anti-peeping component includes:

forming an anti-peeping layer; and forming the connection layer on the anti-peeping layer, wherein the plurality of anti-peeping structures are inlaid in the connection layer.

Optionally, the anti-peeping component further includes a substrate layer;

before forming the anti-peeping layer, the method further includes: forming the substrate layer;

forming the anti-peeping layer includes: forming the anti-peeping layer on the substrate layer, wherein the first surface of the anti-peeping structure is in contact with the substrate layer, and the second surface is distal from the base layer; and forming the connection layer on the anti-peeping layer includes: forming the connection layer on the anti-peeping layer, wherein a filling layer is formed on one of the position: a side, distal from the anti-peeping layer, of the connection layer, and a side, distal from the connection layer, of the anti-peeping layer, and a refractive index of the filling layer is less than the refractive index of the first light guide plate.

Optionally, the method further includes:

manufacturing a second light source and a second light guide plate, wherein the second light guide plate is provided with a light emitting surface and a backlight surface that are opposite, the light emitting surface is a flat surface, and the backlight surface is a dot pattern surface;

disposing the second light guide plate on a side, distal from the anti-peeping component, of the first light guide plate, wherein the light emitting surface of the second light guide plate is proximal to the first light guide plate, the backlight surface of the second light guide plate is distal from the first light guide plate, the dielectric layer is between the first light guide plate and the second light guide plate, and a refractive index of the dielectric layer is less than both the refractive index of the first light guide plate and a refractive index of the second light guide plate; and setting the second light source as an edge-type light source of the second light guide plate.

Optionally, the method further includes:

disposing a side reflective layer on a side surface of the first light guide plate, wherein the side reflective layer is opposite to the first light source; and disposing a bottom reflective layer on the backlight surface of the second light guide plate.

In still another aspect, a method for controlling a backlight module is provided, applicable to the backlight module in the foregoing aspect. The method includes:

controlling, when the backlight module is in an anti-peeping mode, the first light source to emit light, wherein after being totally reflected on a backlight surface of the first light guide plate, the light emitted by the first light source sequentially passes through the light emitting surface of the first light guide plate and a first surface of an anti-peeping structure to emit into the anti-peeping structure; and after being reflected on the third surface of the anti-peeping structure, the light passes through the second surface of the anti-peeping structure and emits out from the anti-peeping component.

Optionally, the method further includes:

controlling, when the backlight module is in an anti-peeping mode, the second light source to be turned off; and controlling, when the backlight module is in a sharing mode, the second light source to emit light, wherein light emitted by the second light source is scattered by the backlight surface of a second light guide plate, is then emitted into the dielectric layer, sequentially passes through the dielectric layer and the first light guide plate to emit into the anti-peeping component, then passes through the plurality of anti-peeping structures and a region between each adjacent anti-peeping structures to emit out of the anti-peeping component.

Optionally, the method further includes: controlling, when the backlight module is in the sharing mode, the first light source to emit light, wherein after being totally reflected on the backlight surface of the first light guide plate, light emitted by the first light source sequentially passes through the light emitting surface of the first light guide plate and the first surface of the anti-peeping structure, and is then emitted into the anti-peeping structure; and after being reflected on the third surface of the anti-peeping structure, the light passes through the second surface of the anti-peeping structure and is emitted out of the anti-peeping component.

In yet another aspect, a display apparatus is provided. The display apparatus includes a display panel and the backlight module in the foregoing aspect.

BRIEF DESCRIPTION OF THE DRAWINGS

To describe the technical solutions according to the embodiments of the present disclosure more clearly, the accompanying drawings for describing the embodiments are described below briefly. Apparently, the accompanying drawings in the following description are only some embodiments of the present disclosure, and a person of ordinary skill in the art can derive other drawings from these accompanying drawings without creative efforts.

Figure 1:
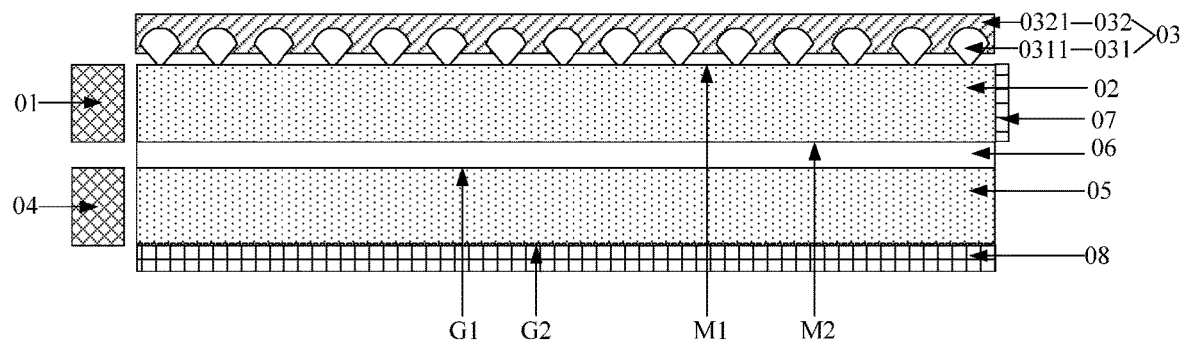
FIG. 1 is a schematic structural diagram of a backlight module according to an embodiment of the present disclosure.

The accompanying drawings herein are incorporated into this specification and constitute a part of the specification, show embodiments consistent with the present disclosure, and are used together with the specification to explain the principles of the present disclosure.

DETAILED DESCRIPTION

To make the principles, technical solutions, and advantages of the present disclosure clearer, the present disclosure will be clearly described below with reference to the accompanying drawings. It is apparent that the described embodiments are merely some rather than all of the embodiments of the present disclosure. Based on the embodiments of the present disclosure, all the other embodiments obtained by a person of ordinary skill in the art without inventive efforts fall within the protection scope of the present disclosure.

The liquid crystal display apparatus usually includes a backlight module and a display panel. In a liquid crystal display apparatus having an anti-peeping display function, the backlight module includes a light guide plate, a light source, and an anti-peeping film and a polymer dispersed liquid crystal (PDLC) on a light emitting side of the light guide plate. After passing through the light guide plate, light emitted by the light source sequentially passes through the anti-peeping film and the PDLC and is emitted into the display panel, such that the display panel implements a display function. When an external electric field is applied to the PDLC, liquid crystal molecules in the PDLC are arranged orderly. An optical axis direction of the liquid crystal molecules is parallel to an electric field direction of the external electric field. A refractive index of the liquid crystal molecules matches a refractive index of a matrix of the PDLC to a certain degree. Light passes through the matrix to make the PDLC transparent, the backlight module is in an anti-peep mode, and the display panel implements an anti-peeping display function based on the light emitted into the display panel. When no external electric field is applied to the PDLC, the optical axis direction of the liquid crystal molecules in the PDLC is random, the liquid crystal molecules are in a disordered state, light emitted into the PDLC is scattered, the PDLC is in a scattered state, the backlight module is in a sharing mode, the PDLC scatters the light emitted into the PDLC and transmits the light to the display panel, and the display panel implements a shared display function based on the light emitted into the display panel. However, the PDLC is expensive and requires application of the external electric field to set the backlight module in an anti-peeping mode. Therefore, the backlight module has relatively high costs and power consumption, which leads to relatively high costs and power consumption of the liquid crystal display apparatus.

An embodiment of the present disclosure provides a backlight module, such that an anti-peeping mode of the backlight module can be implemented without using a PDLC, which helps reduce costs and power consumption of the backlight module, thereby reducing costs and power consumption of the display apparatus. The solutions of the present disclosure are described below with reference to the accompanying drawings.

Figure 2:
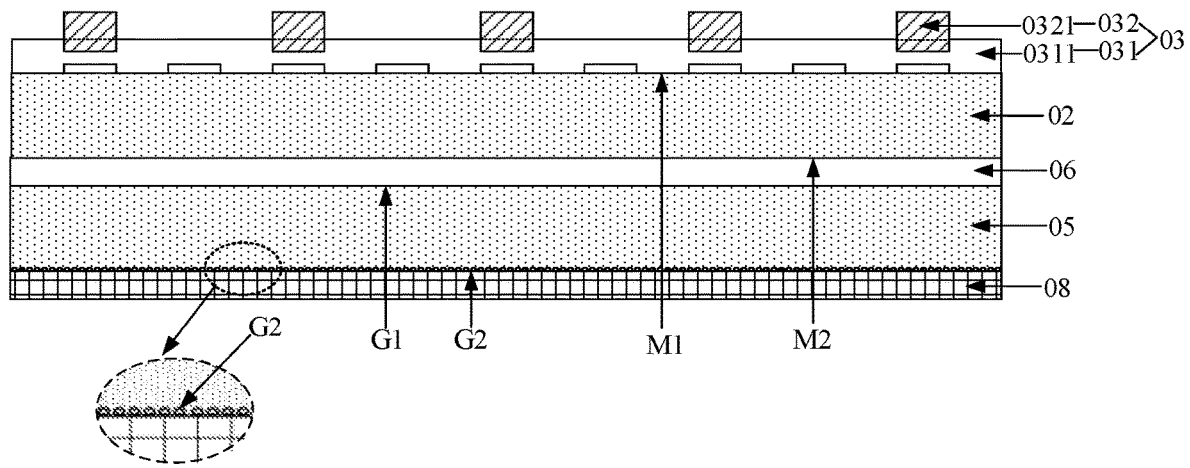
FIG. 2 is a right view of the backlight module shown in FIG. 1.

Exemplarily, FIG. 1 is a schematic structural diagram of a backlight module 0 according to an embodiment of the present disclosure, and FIG. 2 is a right view of the backlight module 0 shown in FIG. 1. Referring to FIG. 1 and FIG. 2, the backlight module 0 includes: a first light source 01, a first light guide plate 02, and an anti-peeping component 03. The first light source 01 is an edge-type light source of the first light guide plate 02 (in other words, the first light source 01 is disposed on a side where a side surface of the first light guide plate 02 is disposed). The first light guide plate 02 is provided with a light emitting surface M1 and a backlight surface M2 that are opposite. Both the light emitting surface M1 and the backlight surface M2 are flat surfaces, the anti-peeping component 03 is disposed on the light emitting surface M1 of the first light guide plate 02, and a refractive index of a dielectric, in the backlight module 0, in contact with the backlight surface M2 of the first light guide plate 02 is less than a refractive index of the first light guide plate 02. The anti-peeping component 03 includes an anti-peeping layer 031 including a plurality of anti-peeping structures 0311. The plurality of anti-peeping structures 0311 are arranged in multiple columns of an array, each anti-peeping structure 0311 is provided with a first surface (marked in neither FIG. 1 nor FIG. 2) proximal to the first light guide plate 02, a second surface (marked in neither FIG. 1 nor FIG. 2) distal from the first light guide plate 02, and two third surfaces (marked in neither FIG. 1 nor FIG. 2) intersecting both the first surface and the second surface. The two third surfaces are opposite, an included angle between each third surface and the first surface is an obtuse angle, and the second surface is a free-form surface.

After being totally reflected on the backlight surface M2 of the first light guide plate 02, light emitted by the first light source 01 can sequentially pass through the light emitting surface M1 of the first light guide plate 02 and the first surface of the anti-peeping structure 0311, and is emitted into the anti-peeping structure 0311; and after being reflected on the third surface of the anti-peeping structure 0311, the light passes through the second surface of the anti-peeping structure 0311 and is emitted out from the anti-peeping component 03. In this case, the backlight module 0 is in the anti-peeping mode, and a display apparatus including the backlight module 0 implements an anti-peeping display function.

To sum up, based on the backlight module provided in this embodiment of the present disclosure, the included angle between the third surface and the first surface of the anti-peeping structure is an obtuse angle, the light emitted by the first light source passes through the first surface of the anti-peeping structure, and is emitted into the anti-peeping structure; after being reflected on the third surface of the anti-peeping structure, the light then passes through the second surface of the anti-peeping structure, and is emitted out of the anti-peeping component. Therefore, the light emitted out of the anti-peeping structure concentrates to a central region of the second surface of the anti-peeping structure, such that the light emitted out of the backlight module concentrates to a central region of a light emitting surface of the backlight module, thereby reducing a half-brightness angle and a cut-off angle of the backlight module, to implement the anti-peeping mode of the backlight module. Based on the solution provided in this embodiment of the present disclosure, the anti-peeping mode of the backlight module can be implemented without using a PDLC. Therefore, costs and power consumption of the backlight module are relatively low.

Optionally, still referring to FIG. 1 and FIG. 2, the backlight module 0 further includes: a second light source 04, a second light guide plate 05, and a dielectric layer 06. The second light source 04 is an edge-type light source of the second light guide plate 05 (in other words, the second light source 04 is disposed on a side where a side surface of the second light guide plate 05 is disposed). The second light guide plate 05 is provided with a light emitting surface G1 and a backlight surface G2 that are opposite. The light emitting surface G1 is a flat surface, the backlight surface G2 is a dot pattern surface, the second light guide plate 05 is disposed on a side, distal from the anti-peeping component 03, of the first light guide plate 02, the light emitting surface G1 of the second light guide plate 05 is proximal to the first light guide plate 02, and the backlight surface G2 of the second light guide plate 05 is distal from the first light guide plate 02. The dielectric layer 06 is disposed between the first light guide plate 02 and the second light guide plate 05, and a refractive index of the dielectric layer 06 is less than both the refractive index of the first light guide plate 02 and a refractive index of the second light guide plate 05. After being scattered by the backlight surface G2 of the second light guide plate 05, light emitted by the second light source 04 can be emitted into the dielectric layer 06, sequentially passes through the dielectric layer 06 and the first light guide plate 02, is emitted into the anti-peeping component 03, then passes through the plurality of anti-peeping structures 0311 and a region between each adjacent anti-peeping structures 0311, and is emitted out of the anti-peeping component 03. In this case, the backlight module 0 is in a sharing mode, and the display apparatus including the backlight module 0 implements a sharing display function.

In this embodiment of the present disclosure, a backlight surface and/or a light emitting surface of a light guide plate are/is flat surfaces/a flat surface means that the backlight surface and/or the light emitting surface of the light guide plate are/is not provided with dots. A backlight surface and/or a light emitting surface of a light guide plate are/is dot pattern surfaces/a dot pattern surface means that the backlight surface and/or the light emitting surface of the light guide plate are/is provided with dots. The backlight surface and/or the light emitting surface are/is usually flat surfaces/a flat surface. For example, both the light emitting surface M1 and the backlight surface M2 of the first light guide plate 02 are flat surfaces means that both the light emitting surface M1 and the backlight surface M2 of the first light guide plate 02 are not provided with dots; the backlight surface G2 of the second light guide plate 05 is a dot pattern surface means that the backlight surface G2 of the second light guide plate 05 is provided with dots, and the backlight surface G2 may be a flat surface with dots. The dots on the backlight surface G2 may be circular dots, square dots, or of course dots of another shape, which is not limited in this embodiment of the present disclosure.

Figure 3:
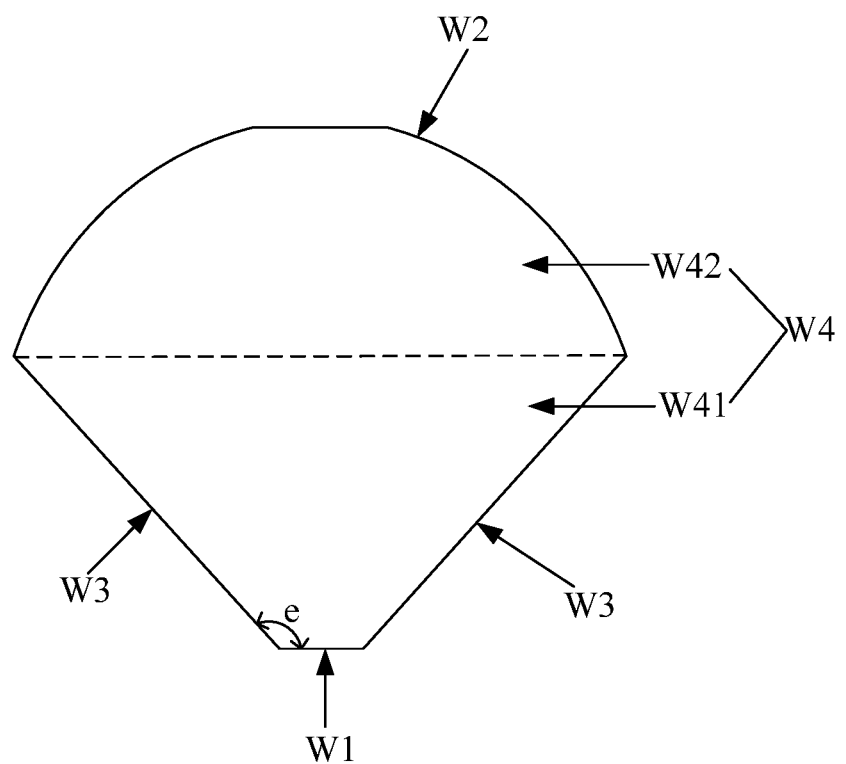
FIG. 3 is a schematic structural diagram of an anti-peeping structure according to an embodiment of the present disclosure.
Figure 4:
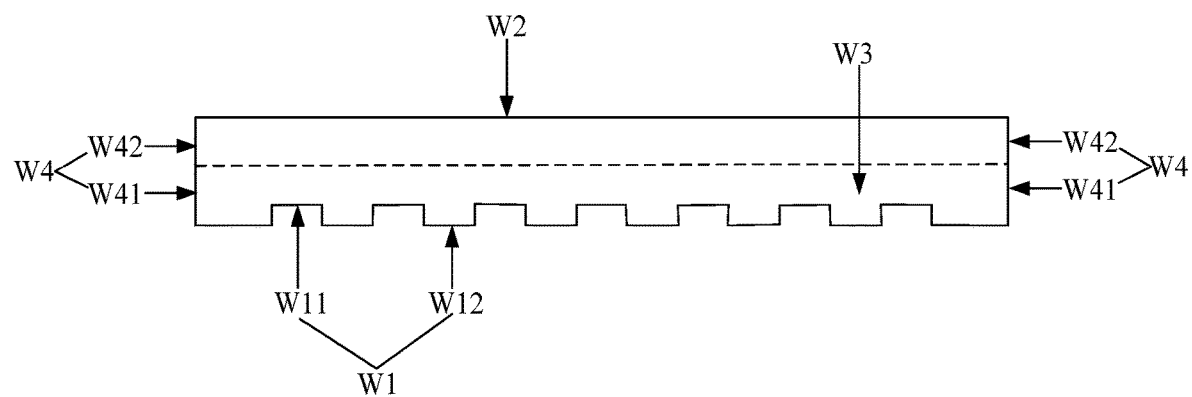
FIG. 4 is a right view of the anti-peeping structure shown in FIG. 3.

Optionally, in this embodiment of the present disclosure, each anti-peeping structure 0311 is further provided with two parallel end surfaces (marked in neither FIG. 1 nor FIG. 2). In the anti-peeping structure 0311, each end surface is in contact with each of the first surface, the second surface, and the two third surfaces. Exemplarily, FIG. 3 is a schematic structural diagram of an anti-peeping structure 0311 according to an embodiment of the present disclosure, and FIG. 4 is a right view of the anti-peeping structure 0311 shown in FIG. 3. Referring to FIG. 3 and FIG. 4, the anti-peeping structure 0311 is provided with a first surface W1 and a second surface W2 that are opposite, two third surfaces W3 intersecting both the first surface W1 and the second surface W2, and two parallel end surfaces W4. The two third surface W3 are opposite, an included angle e between each of the third surfaces W3 and the first surface W1 is an obtuse angle, the first surface W1 is provided with a recess region W11 and a flat region W12, and the second surface W2 is a free-form surface. With reference to FIG. 1 to FIG. 4, the light emitted by the first light source 01 can be totally reflected on a first region (marked in none of FIG. 1 to FIG. 4) of the light emitting surface M1 of the first light guide plate 02, and the light totally reflected by the backlight surface M2 of the first light guide plate 02 can sequentially pass through a second region (marked in none of FIG. 1 to FIG. 4) of the light emitting surface M1 of the first light guide plate 02 and the flat region W12 of the anti-peeping structure 0311, and be emitted into the anti-peeping structure 0311. The second region of the light emitting surface M1 of the first light guide plate 02 is a region, corresponding to the flat region W12 of the anti-peeping structure 0311, of the light emitting surface M1 of the first light guide plate 02, and the first region of the light emitting surface M1 of the first light guide plate 02 is a region (in other words, the recess region W11 of the anti-peeping structure 0311 and a region, corresponding to the region between adjacent anti-peeping structures 0311, of the light emitting surface of the first light guide plate 02) of the light emitting surface M1 of the first light guide plate 02 except the second region. Optionally, the first surface W1 of the anti-peeping structure 0311 is a serrated surface.

In this embodiment of the present disclosure, with reference to FIG. 1 to FIG. 4, the first surface W1 of the anti-peeping structure 0311 is provided with the recess region W11 and the flat region W12, the recess region W11 may block direct contact between the anti-peeping structure 0311 and the first light guide plate 02, and the flat region W12 may enable the anti-peeping structure 0311 to directly come into contact with the first light guide plate 02. Therefore, light emitted by the first light guide plate 02 to the recess region W11 can be totally reflected in the first light guide plate 02, but cannot be emitted from the recess region W11 into the anti-peeping structure 0311, and light emitted from the first light guide plate 02 to the flat region W12 can sequentially pass through the light emitting surface M1 of the first light guide plate 02 and the flat region W12 and be emitted into the anti-peeping structure 0311, such that the flat region W12 may extract light from the light in the first light guide plate 02. Based on such a light extraction principle, a quantity of light extracted by the anti-peeping structure 0311 may be controlled by adjusting a spacing between adjacent flat regions W12, to adjust uniformity of a screen of the display apparatus. Usually, a larger area of the flat region W12 leads to a larger area of contact between the anti-peeping structure 0311 and the first light guide plate 02, a larger quantity of light extracted by the anti-peeping structure 0311, and higher brightness of the backlight module 0. In contrast, a smaller area of the flat region W12 leads to a smaller area of contact between the anti-peeping structure 0311 and the first light guide plate 02, a smaller quantity of light extracted by the anti-peeping structure 0311, and lower brightness of the backlight module 0.

Optionally, still referring to FIG. 3 and FIG. 4, the anti-peeping structure 0311 is an integrated structure formed by superposition of a step and a curved-surface solid (Neither the step nor the curved-surface solid is marked in FIG. 3 and FIG. 4. A superposition surface between the step and the curved-surface solid is shown by a dashed line in FIG. 3 and FIG. 4). The step is provided with a first bottom surface (that is, the first surface W1 in FIG. 3 and FIG. 4) and a second bottom surface (that is, the surface shown by the dashed line in FIG. 3 and FIG. 4) that are parallel to each other, two first side surfaces W41 parallel to each other, and two opposite second side surfaces (that is, the third surfaces W3 in FIG. 3 and FIG. 4). An included angle between each of the second side surfaces and the first bottom surface is an obtuse angle. The curved-surface solid is provided with two first surfaces W42 parallel to each other, and a second surface (that is, the second surface W2 in FIG. 3 and FIG. 4) and the third surface (that is, the surface shown by the dashed line in FIG. 3 and FIG. 4) that are opposite. The second surface is a free-form surface, the two first surfaces W42 and the third surface are all flat surfaces, the third surface of the curved-surface solid is superposed with the second bottom surface of the step, the second surface of the curved-surface solid intersects the two second side surfaces of the step, and the two first surfaces W42 of the curved-surface solid and the two first side surfaces W41 of the step are coplanar in one-to-one correspondence to form the two end surfaces W4 of the anti-peeping structure 0311. It is easy to know that, the first bottom surface of the step is a serrated surface, the first bottom surface of the step is the first surface W1 of the anti-peeping structure 0311, the second surface of the curved-surface solid is a free-form surface, the second surface of the curved-surface solid is the second surface W2 of the anti-peeping structure 0311, and the two second side surfaces of the step are the two third surfaces W3 of the anti-peeping structure 0311.

Figure 5:
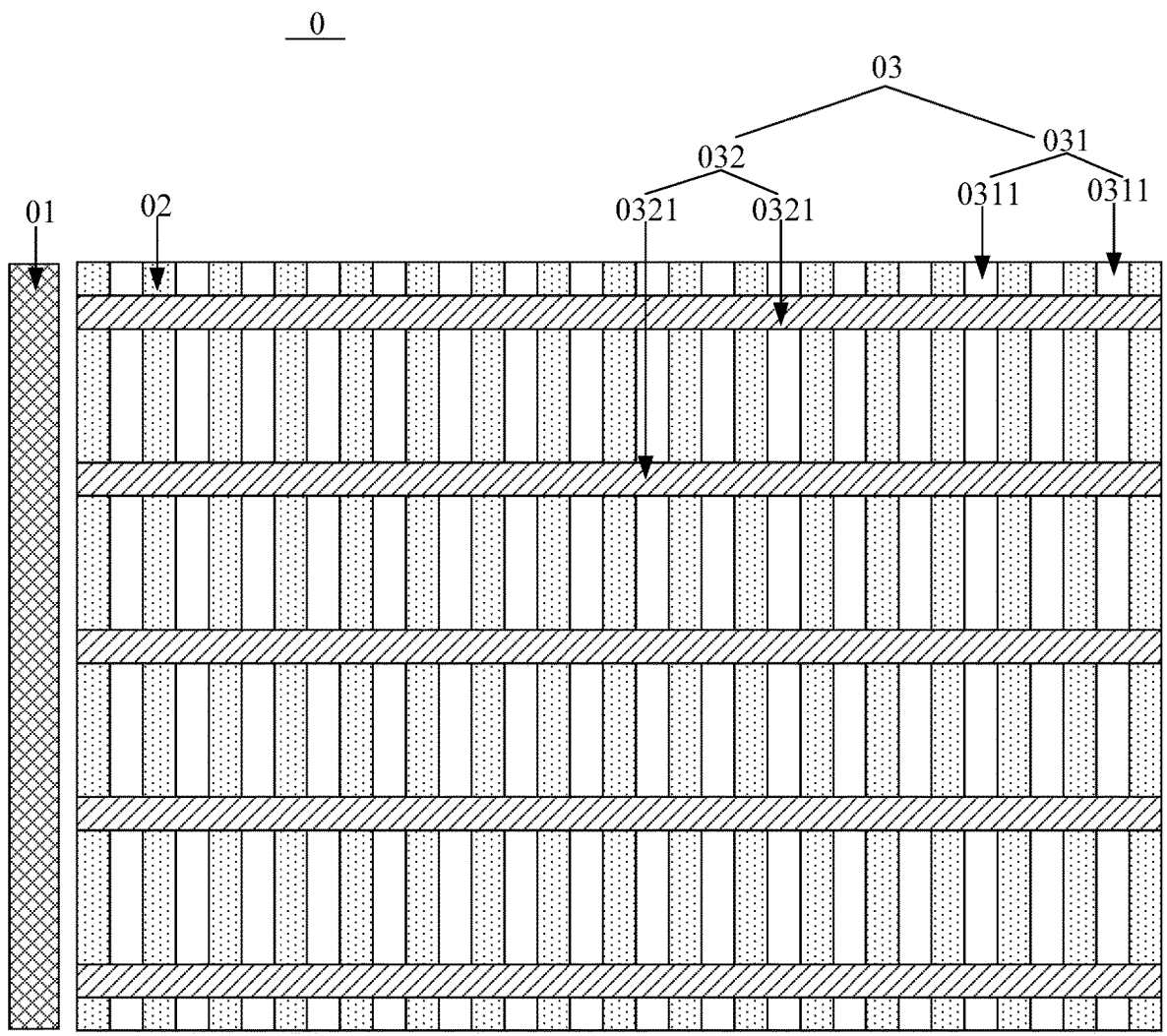
FIG. 5 is a schematic front view of a backlight module according to an embodiment of the present disclosure.
Figure 6:
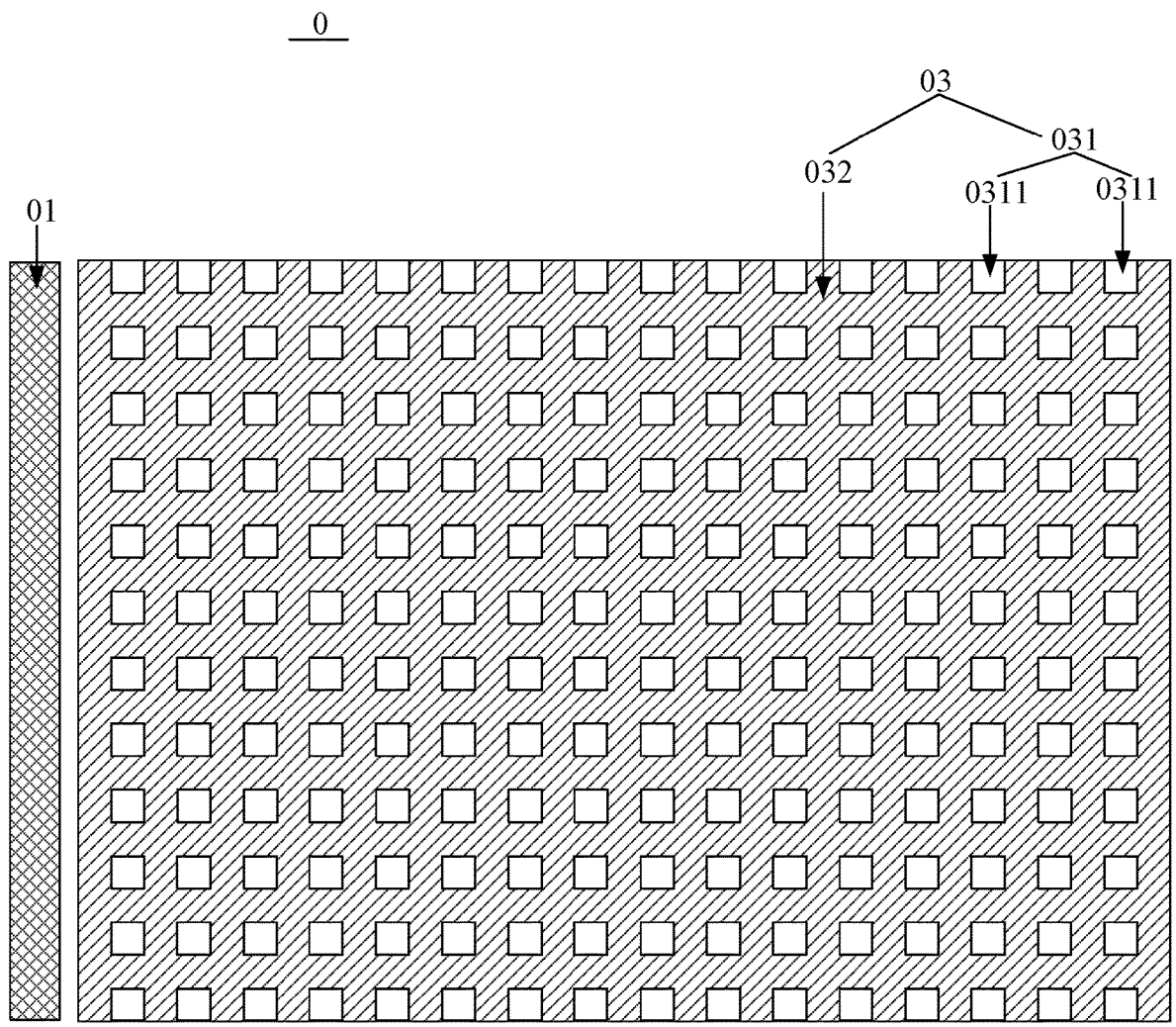
FIG. 6 is a schematic front view of another backlight module according to an embodiment of the present disclosure.

Optionally, FIG. 5 and FIG. 6 are respectively schematic front views of two backlight modules 0 according to embodiments of the present disclosure. Referring to FIG. 5 and FIG. 6, the anti-peeping component 03 includes an anti-peeping layer 031, the anti-peeping layer 031 includes a plurality of anti-peeping structures 0311, and the plurality of anti-peeping structures 0311 are arranged in multiple columns of an array. Optionally, as shown in FIG. 5, each of the anti-peeping structures 0311 is strip-shaped, and each column of the anti-peeping layer 031 is provided with one of the anti-peeping structure 0311. Alternatively, as shown in FIG. 6, each of the anti-peeping structure 0311 is block-shaped, and each column of the anti-peeping layer 031 is provided with a plurality of anti-peeping structures 0311. A first section of the block-shaped anti-peeping structure 0311 may be in rectangular. For example, as shown in FIG. 6, the first section of the block-shaped anti-peeping structure 0311 is in square, and the first section of the block-shaped anti-peeping structure 0311 is parallel to a layer surface of the anti-peeping layer 031.

Optionally, still referring to FIG. 1, FIG. 2, FIG. 5, and FIG. 6, the anti-peeping component 03 further includes a connection layer 032 disposed on the anti-peeping layer 031. The plurality of anti-peeping structures are inlaid in the connection layer 032.

Figure 16:
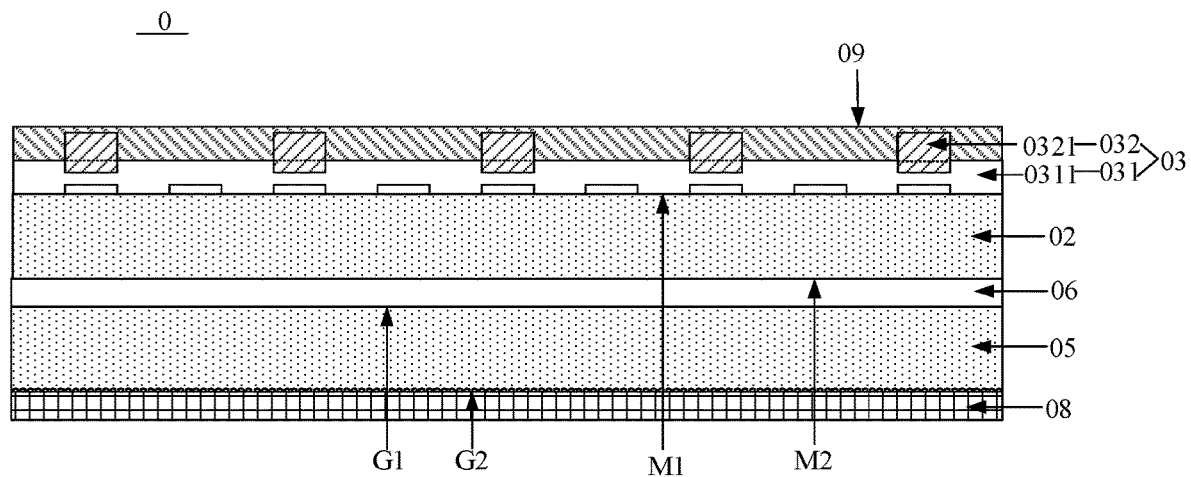
FIG. 16 is a schematic right view of a backlight module including a filling layer according to an embodiment of the present disclosure.
Figure 17:
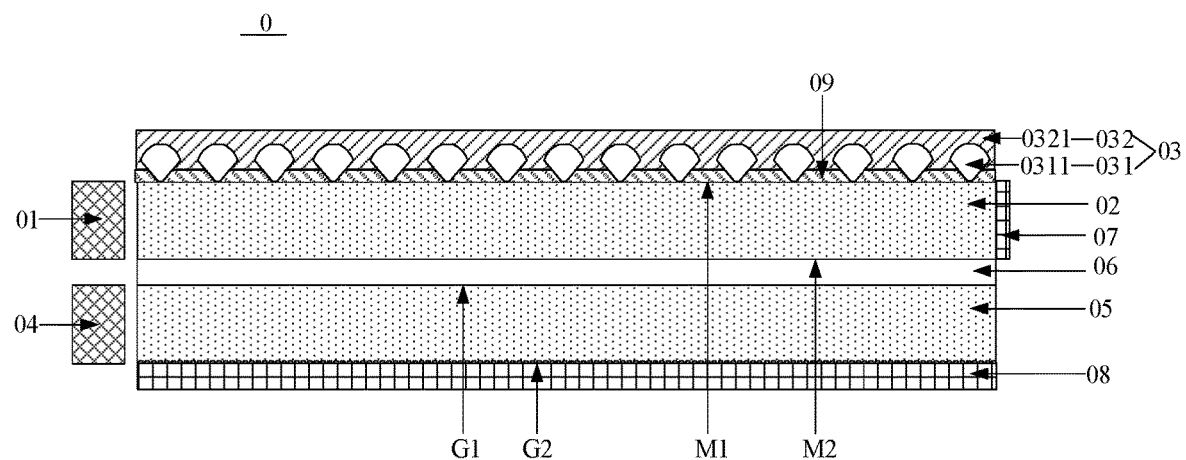
FIG. 17 is a schematic structural diagram of another backlight module including a filling layer according to an embodiment of the present disclosure.

Optionally, as shown in FIG. 1, FIG. 2, and FIG. 5, when the anti-peeping structure 0311 is strip-shaped, the connection layer 032 includes a plurality of connecting strips 0321 extending in a same direction, the plurality of connecting strips 0321 are arranged in an array, and each of the connecting strips 0321 intersecting the plurality of anti-peeping structures 0311. Exemplarily, as shown in FIG. 5, the plurality of connecting strips 0321 extend in a same direction, two ends of each of the plurality of connecting strips 0321 are collinear in one-to-one correspondence, and each of the connecting strips 0321 perpendicularly intersects the plurality of anti-peeping structures 0311. Optionally, when the anti-peeping structure 0311 is strip-shaped, and the first surface of the anti-peeping structure 0311 is provided with the recess region and the flat region, as shown in FIG. 2, an orthographic projection of each of the connecting strip 0321 on the anti-peeping layer 031 falls within recess regions of first surfaces of the plurality of anti-peeping structures 0311. In this embodiment of the present disclosure, since the connecting strip 0321 has no dimming effect and the orthographic projection of each of the connecting strip 0321 on the anti-peeping layer 031 falls within the recess regions of the first surfaces of the anti-peeping structures 0311, stray light formed by emitting light from the connecting strip 0321, which affect an anti-peeping display effect, can be avoided. In this embodiment of the present disclosure, the plurality of connecting strips 0321 intersect the plurality of anti-peeping structures 0311, such that grid spaces are formed on the anti-peeping component 03. The anti-peeping component 03 may further include a filling layer 09 (marked in FIG. 16 and FIG. 17). The filling layer 09, as shown in FIG. 16, may be disposed on a side, distal from the anti-peeping layer 031, of the connection layer 032, or as shown in FIG. 17, the filling layer 09 may be disposed on a side, distal from the connection layer 032, of the anti-peeping layer 031. The filling layer may be configured to fill the grid spaces of the anti-peeping component 03. A refractive index of the filling layer is less than the refractive index of the first light guide plate 02. The filling layer may be a film layer formed by using a material whose refractive index is less than the refractive index of the first light guide plate 02, or may be an air layer, which is not limited in this embodiment of the present disclosure.

Optionally, as shown in FIG. 6, when the anti-peeping structure 0311 is block-shaped, the connection layer 032 may be of a net structure. A shape of a mesh of the connection layer 032 may match a shape of the anti-peeping structure 0311. The plurality of anti-peeping structures 0311 are inlaid in meshes of the connection layer 032.

In this embodiment of the present disclosure, the anti-peeping structure 0311 shown in FIG. 5 and the anti-peeping structure 0311 shown in FIG. 6 are provided with a same structure, and a difference lies in that the anti-peeping structure 0311 shown in FIG. 6 is provided with a smaller length and that the anti-peeping structure 0311 shown in FIG. 5 is provided with a larger length. Therefore, from a perspective of FIG. 6, the anti-peeping structure 0311 is block-shaped. Optionally, when the anti-peeping structure 0311 is block-shaped, length directions of all anti-peeping structures 0311 in each column are parallel, and the length direction of the anti-peeping structure 0311 may be a direction perpendicular to the two end surfaces of the anti-peeping structure 0311. It is easily understood that, regardless of the anti-peeping structure 0311 shown in FIG. 5 or the anti-peeping structure 0311 shown in FIG. 6, both the structures thereof are shown in FIG. 3 and FIG. 4. In this embodiment of the present disclosure, a gap of the connection layer 032 (a distance between adjacent connecting strips 0321 or a size of a mesh) may be uniform or non-uniform, and the gap of the connection layer 032 may be set based on an anti-peeping strength requirement of the anti-peeping component 03. Usually, a smaller gap of the connection layer 032 indicates higher anti-peeping strength and a better anti-peeping effect.

Figure 18:
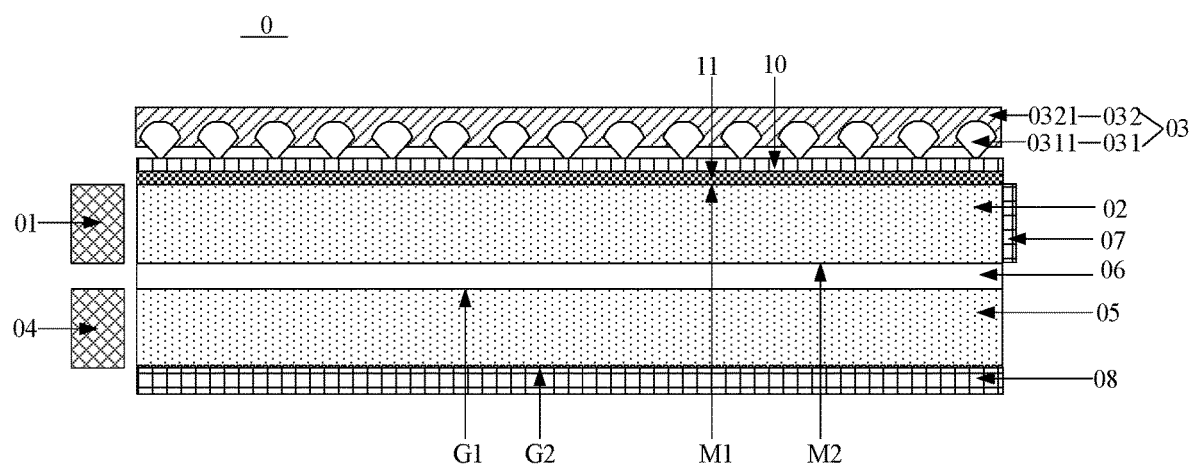
FIG. 18 a schematic structural diagram of a backlight module including a substrate layer and an optical adhesive according to an embodiment of the present disclosure.

Optionally, referring to FIG. 18, the anti-peeping component 03 further includes: a substrate layer 10. The anti-peeping layer 031 and the connection layer 032 are sequentially disposed on the substrate layer 10. The substrate layer 10 may be attachable on the light emitting surface M1 of the first light guide plate 02 by an optical adhesive 11, such that the anti-peeping component 03 is fixed on the light emitting surface M1 of the first light guide plate 02. Optionally, refractive indexes of the substrate layer, the optical adhesive, and the first light guide plate 02 are equal. In this way, the substrate layer and the optical adhesive may be prevented from interfering with light emitted from the first light guide plate 02 into the anti-peeping layer 031. In practice, the anti-peeping component 03 may include the anti-peeping layer 031 and the connection layer 032, but does not include the substrate layer. Correspondingly, the anti-peeping structure 0311 may be directly attachable on the light emitting surface M1 of the first light guide plate 02, so as to fix the anti-peeping component 03 on the light emitting surface M1 of the first light guide plate 02, which is not limited in this embodiment of the present disclosure.

Optionally, still referring to FIG. 1 and FIG. 2, the backlight module 0 further includes: a side reflective layer 07 disposed on a side surface of the first light guide plate 02, wherein the side reflective layer 07 is opposite to the first light source 01; and a bottom reflective layer 08 disposed on the backlight surface G2 of the second light guide plate 05. Both the side reflective layer 07 and the bottom reflective layer 08 may be implemented by sticking a reflective sheet or plating a reflective film at a corresponding location. The reflective sheet may be an enhanced specular reflector (ESR), which is not limited in this embodiment of the present disclosure.

Optionally, in this embodiment of the present disclosure, both the first light source 01 and the second light source 04 may be light emitting diode (LED) light bars, and a length direction of the first light source 01, a length direction of the second light source 04, and the length direction of the anti-peeping structure 0311 may be parallel. The length direction of the anti-peeping structure 0311 means a direction perpendicular to the two end surfaces of the anti-peeping structure 0311. The anti-peeping structure 0311 may be a prism. The first light guide plate 02, the second light guide plate 05, the anti-peeping structure 0311, and the connection layer 032 may use a same material. For example, the materials of these four may all be polymethyl methacrylate (PMMA) or polycarbonate (PC). A refractive index of the PMMA is 1.49, and a refractive index of the PC is 1.58. Optionally, materials of the anti-peeping structure 0311 and the connection layer 032 may also be an ultraviolet (UV) adhesive. The dielectric layer 06 may be a film layer manufactured by a material whose refractive index is less than the refractive index of the first light guide plate 02 and less than the refractive index of the second light guide plate 05. Alternatively, the dielectric layer 06 may be an air layer. In the case that the dielectric layer 06 is the air layer, a support structure may be disposed between the first light guide plate 02 and the second light guide plate 05 to support the first light guide plate 02 and the second light guide plate 05, to form the air layer between the first light guide plate 02 and the second light guide plate 05. Alternatively, a groove may be formed on the backlight surface M2 of the first light guide plate 02 and/or the light emitting surface G1 of the second light guide plate 05, such that a cavity is formed between the first light guide plate 02 and the second light guide plate 05 as the air layer after the second light guide plate 05 is disposed on a side, distal from the anti-peeping component 03, of the first light guide plate 02. The dielectric layer 06 is not limited in this embodiment of the present disclosure. A person skilled in the art easily understand that the structures of the backlight module 0 described in this specification are merely exemplary, and the backlight module may include more or fewer structures than those of the backlight module 0 described in this specification. For example, the backlight module may further include a structure such as a plastic frame, a diffusion sheet, a prism sheet, a protective sheet, and a light-shielding tape, which are not repeatedly described herein.

Figure 7:
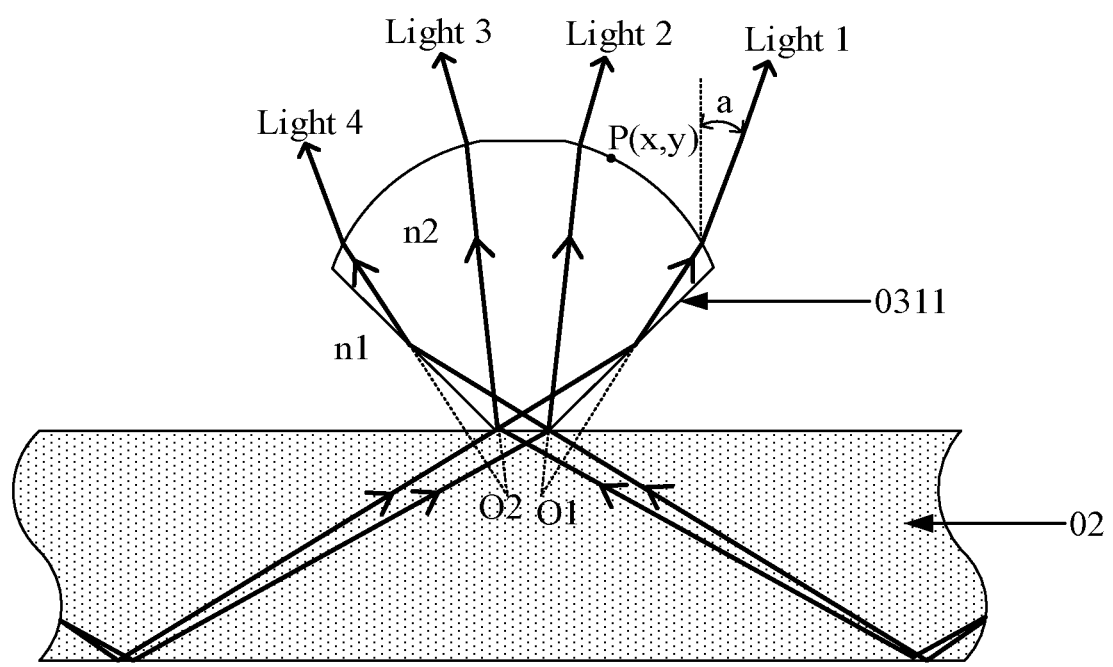
FIG. 7 is an indication diagram of propagation of light in a first light guide plate and an anti-peeping structure according to an embodiment of the present disclosure.

FIG. 7 is an indication diagram of propagation of light in the first light guide plate 02 and the anti-peeping structure 0311 according to an embodiment of the present disclosure. A deriving process of the second surface (the free-form surface) of the anti-peeping structure 0311 according to this embodiment of the present disclosure is illustrated below with reference to FIG. 7.

Referring to FIG. 7, assuming that light 1 and light 2 are boundary light emitted from the free-form surface of the anti-peeping structure 0311 after being reflected in the first light guide plate 02 for multiple times, with reference to FIG. 1 and FIG. 2, the light emitted from the first light guide plate 02 irradiates onto an inclined surface (in other words, the third surface of the anti-peeping structure 0311) of the anti-peeping structure 0311, and an included angle e between the third surface and the first surface of the anti-peeping structure 0311 is controlled, such that the light reflected by the third surface of the anti-peeping structure 0311 may be regular. Based on a light law, the light 1 and the light 2 may be equivalent to light that is emitted from a light source point O1, passes through the first light guide plate 02 and the anti-peeping structure 0311, and is emitted out of the free-form surface of the anti-peeping structure 0311. Similarly, light 3 and light 4 may be equivalent to light that is emitted from a light source point 02, passes through the first light guide plate 02 and the anti-peeping structure 0311, and is emitted from the free-form surface of the anti-peeping structure 0311. A refracting phenomenon of light emitted from the first light guide plate 02 into the anti-peeping structure 0311 may usually affect locations of the light source points O1 and O2, and does affect the deriving process of the free-form surface. Therefore, in the deriving process of the free-form surface, assuming that a refractive index of the anti-peeping structure 0311 and the refractive index of the first light guide plate 02 are same, the light emitted from the first light guide plate 02 into the anti-peeping structure 0311 does not deflect when being emitted into the anti-peeping structure 0311.

Assuming that coordinates of the light source point O (O1 or O2) are (0, 0), coordinates of any point P in the free-from surface of the anti-peeping structure 0311 are (x, y), the refractive index of the anti-peeping structure 0311 is $n_2$, a refractive index of an external dielectric of the anti-peeping structure 0311 is $n_1$, and an included angle between parallel emergent light (such as the light 1) and a vertical direction (in other words, a direction perpendicular to a plate surface of the first light guide plate 02, which is not marked in FIG. 7) is a. In this way, according to a vector rule of refracted light, and a vector relationship between incident light and emergent light, the following differential relation expression may be obtained:

$$\Delta y = \frac{n_2 x - n_1 \sin\alpha \sqrt{x^2 + y^2}}{n_1 \cos\alpha \sqrt{x^2 + y^2} - n_2 y} \Delta x$$

The above differential relation expression can represent a projection of the free-form surface in a flat surface perpendicular to the length direction of the anti-peeping structure 0311, and the projection is a free curve, $\Delta y$ indicates a difference between a vertical coordinate of a point adjacent to the point P and a vertical coordinate of the point P on the free curve, and $\Delta x$ indicates a difference between a horizontal coordinate of the point adjacent to the point P and a horizontal coordinate of the point P on the free curve. Based on a calculation thought of a differential method, assuming that coordinates (x0, y0) of a point on the free curve are known, it may be obtained according to the differential relation expression: xk=x0+k×$\Delta x$, and yk=y(k−1)+$\Delta y$(k−1), (k=1, 2, 3 . . . ). Referring to FIG. 7, based on an anti-peeping requirement, a smaller the above included angle a leads to a better anti-peeping effect. In the case that it is set that a is equal to 0° (degree), and coordinates of any point on the free curve are (xk, yk), sufficient coordinate points may be obtained according to xk=x0+k×$\Delta x$ and yk=y(k−1)+$\Delta y$(k−1), (k=1, 2, 3 . . . ), and the free curve can be obtained by performing curve fitting on the sufficient coordinate points. A free curved surface of the anti-peeping structure 0311 can be obtained by expanding the free curve along an extension direction perpendicular to the free curve.

Figure 8:
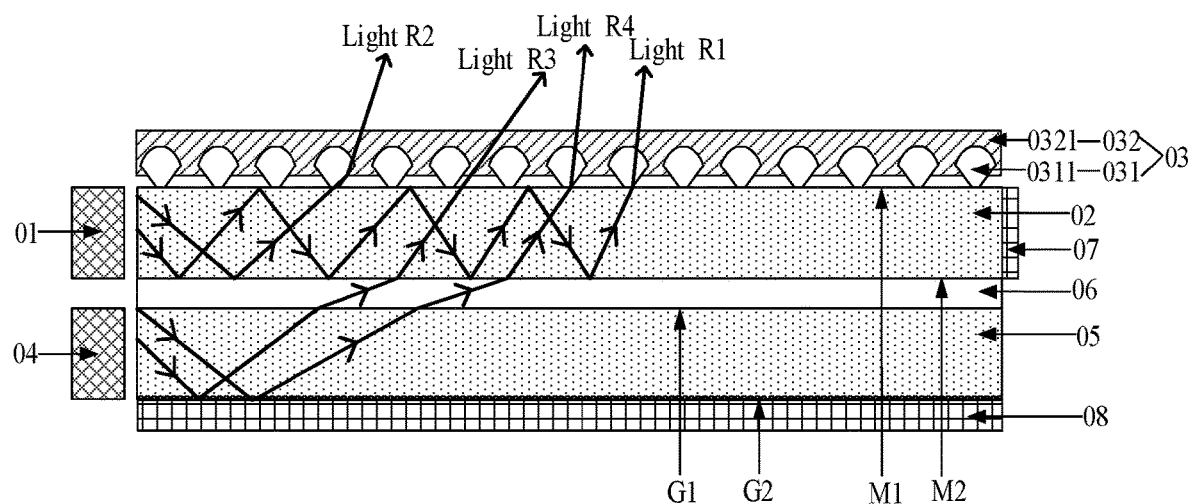
FIG. 8 is an operation schematic diagram of a backlight module according to an embodiment of the present disclosure.

FIG. 8 is an operation schematic diagram of the backlight module 0 according to an embodiment of the present disclosure. An operation process of the backlight module 0 and a switching process of the backlight module 0 between an anti-peeping mode and a sharing mode provided in this embodiment of the present disclosure are described below with reference to FIG. 8.

Referring to FIG. 8, when the first light source 01 is turned on, and the second light source 04 is turned off, since the refractive index of the dielectric layer 06 is less than the refractive index of the first light guide plate 02, and the first surface of the anti-peeping structure 031 is provided with the recess region (an air layer may be formed between the recess region and the substrate layer), light R1 emitted by the first light source 01 is propagated in the first light guide plate 02 because the light R1 is reflected between the backlight surface M2 of the first light guide plate 02 and the first region of the light emitting surface M1 of the first light guide plate 02. In a process of propagating the light R1 in the first light guide plate 02, after the light R1 encounters the second region of the light emitting surface M1 of the first light guide plate 02 (the second region is a region, corresponding to the flat region W12 of the anti-peeping structure 0311, of the light emitting surface M1 of the first light guide plate 02, and the first region is a region on the light emitting surface M1 of the first light guide plate 02 except the second region), total reflection of the light R1 in the first light guide plate 02 is broke, and the light R1 sequentially passes through the second region of the light emitting surface M1 of the first light guide plate 02 and the flat region of the first surface of the anti-peeping structure 031, is emitted into the anti-peeping structure 031, and is propagated in the anti-peeping structure 031. In the process of propagating the light R1 in the anti-peeping structure 031, the anti-peeping structure 031 may adjust the light R1 (an adjustment process may be referenced to FIG. 7), such that the light R1 emitted from the second surface of the anti-peeping structure 031 turns into small-angle light. Likewise, light R2 also turns into small-angle light. A difference lies in that the light R2 directly encounters the second region of the light emitting surface M1 of the first light guide plate 02 after being reflected by the backlight surface M2 of the first light guide plate 02. Since the light emitted from the anti-peeping structure 031 is small-angle light, light emitted from the backlight module 0 is small-angle light, the backlight module 0 is in the anti-peeping mode, and a display apparatus including the backlight module 0 may implement an anti-peeping display function based on the light provided by the backlight module 0. When the first light source 01 is turned off, and the second light source 04 is turned on, light (such as light R3 and light R4) emitted by the second light source 04 is propagated in the second light guide plate 05. Since the backlight surface G2 of the second light guide plate 05 is a dot pattern surface, when the light encounters dots on the backlight surface G2, the light is scattered by the backlight surface G2 of the second light guide plate 05, sequentially passes through the light emitting surface G1 of the second light guide plate 05, the dielectric layer 06, and the first light guide plate 02 after being reflected by the bottom reflective layer 08, is emitted into the anti-peeping component 03, passes through the anti-peeping structures 0311 (such as the light R4) and a region between each adjacent anti-peeping structures 0311 (such as the light R3), and is emitted out of the anti-peeping component 03. Since the light is scattered by the backlight surface G2 of the second light guide plate 05, the light finally emitted from the backlight module 0 is stray light and large-angle light, the backlight module 0 is in the sharing mode, and the display apparatus including the backlight module 0 may implement a sharing display function based on the light provided by the backlight module 0. A person skilled in the art easily understand that, when the first light source 01 and the second light source 04 are simultaneously turned on, the backlight module 0 is also in the sharing mode, and brightness of the backlight module 0 is twice brightness of the backlight module 0 when the second light source 04 is independently turned on. In this case, the backlight module 0 is applicable to high-brightness display.

Figure 9:
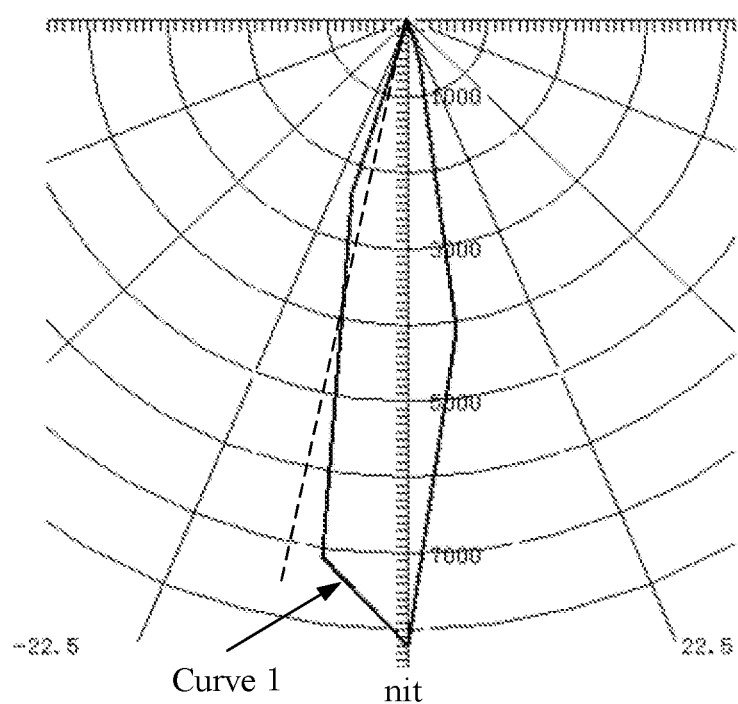
FIG. 9 is a curve chart of angular brightness of a backlight module in an anti-peeping mode according to an embodiment of the present disclosure.
Figure 10:
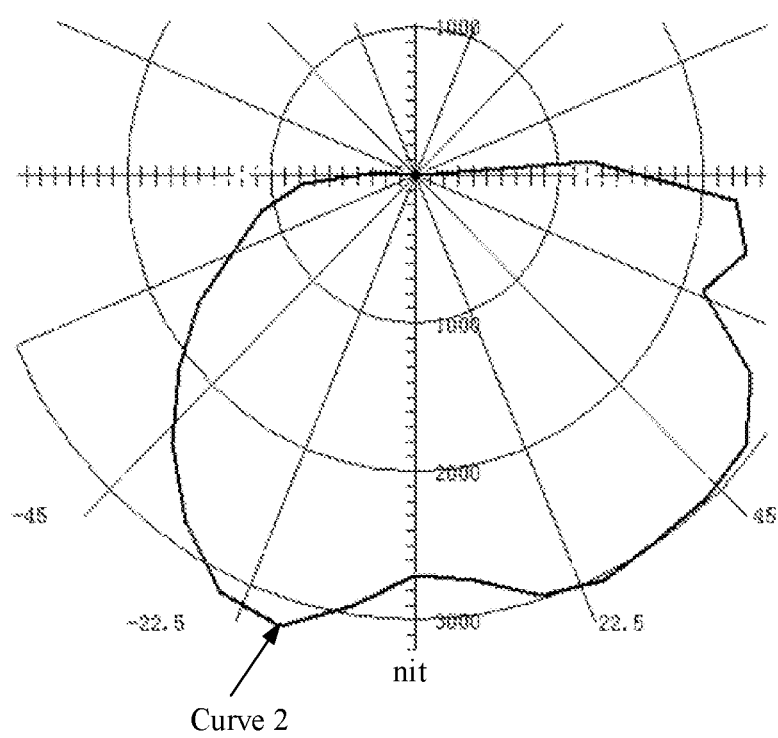
FIG. 10 is a curve chart of angular brightness of a backlight module in a sharing mode according to an embodiment of the present disclosure.

FIG. 9 is a curve chart of angular brightness of the backlight module 0 in an anti-peeping mode according to an embodiment of the present disclosure. FIG. 10 is a curve chart of angular brightness of the backlight module 0 in a sharing mode according to an embodiment of the present disclosure. In FIG. 9 and FIG. 10, a longitudinal axis indicates angular brightness, a unit is nit, a curve 1 is an angular brightness curve of the backlight module 0 in the anti-peeping mode, and a curve 2 is an angular brightness curve of the backlight module 0 in the sharing mode. It can be seen that when the backlight module 0 is in the anti-peeping mode, both a half-brightness angle and a cut-off angle of the backlight module 0 are relatively small; when the backlight module 0 is in the sharing mode, both the half-brightness angle and the cut-off angle of the backlight module 0 are relatively large. It may be determined based on experiments that, when the backlight module 0 is in the anti-peeping mode, the cut-off angle of the backlight module 0 is 22°, and the half-brightness angle is 10°, such that the backlight module 0 is provided with excellent anti-peeping performance. When the backlight module 0 is in the sharing mode, the cut-off angle of the backlight module 0 is 90°, and the half-brightness angle is 45°, such that the backlight module 0 is provided with a relatively large view angle. A half-brightness angle is an included angle between the longitudinal axis and a line connecting a half-brightness point and the origin of coordinates. The half-brightness point is an intersection of a corresponding curve (such as the curve 1) and a circular coordinate axis when brightness is equal to half of maximum brightness. The cut-off angle is an included angle between the longitudinal axis and a line connecting a cut-off brightness point and the origin of coordinates. The cut-off brightness point is an intersection of a corresponding curve (such as the curve 1) and the circular coordinate axis when the brightness is equal to 0. It may be seen by comparing FIG. 9 and FIG. 10 that, when a light quantity of a light source is fixed, maximum brightness (8000 nit) when the backlight module 0 is in the anti-peeping mode is 2.5 times maximum brightness (3200 nit) when the backlight module 0 is in the sharing mode, indicating that the backlight module 0 is provided with a light beam forming function when being in the anti-peeping mode, such that brightness of a central point of the backlight module 0 can be increased.

It is not difficult to understand that, in this embodiment of the present disclosure, turn-on or turn-off of the first light source 01 and the second light source 04 can be controlled, to switch the backlight module 0 between the anti-peeping mode and the sharing mode. Since the backlight module 0 can be switched between the anti-peeping mode and the sharing mode without using a PDLC, problems of relatively high costs and power consumption of the backlight module caused by use of the PDLC can be avoided, thereby reducing power consumption of the backlight module.

To sum up, based on the backlight module provided in this embodiment of the present disclosure, the included angle between the third surface and the first surface of the anti-peeping structure is an obtuse angle, the light emitted by the first light source passes through the first surface of the anti-peeping structure, is emitted into the anti-peeping structure, is reflected on the third surface of the anti-peeping structure, then passes through the second surface of the anti-peeping structure, and is emitted out of the anti-peeping component. Therefore, the light emitted out of the anti-peeping structure concentrates to a central region of the second surface of the anti-peeping structure, such that the light emitted out of the backlight module concentrates to a central region of a light emitting surface of the backlight module, thereby reducing the half-brightness angle and the cut-off angle of the backlight module, to implement the anti-peeping mode of the backlight module. Optionally, the light emitted by the second light source passes through the anti-peeping structures and the region between adjacent anti-peeping structures and is emitted out of the anti-peeping component, such that the half-brightness angle and the cut-off angle of the light emitted from the anti-peeping component are relatively large. Therefore, the backlight module is in the sharing mode. Based on the solution provided in this embodiment of the present disclosure, the anti-peeping mode of the backlight module and switching between the anti-peeping mode and the sharing mode can be implemented without using the PDLC. Therefore, costs and power consumption of the backlight module are relatively low.

The backlight module provided in the embodiments of the present disclosure may be applied to the following method. Manufacturing method, manufacturing principle, controlling method, and controlling principle for the backlight module in the embodiments of the present disclosure may be referenced to descriptions in the following embodiments.

Figure 11:
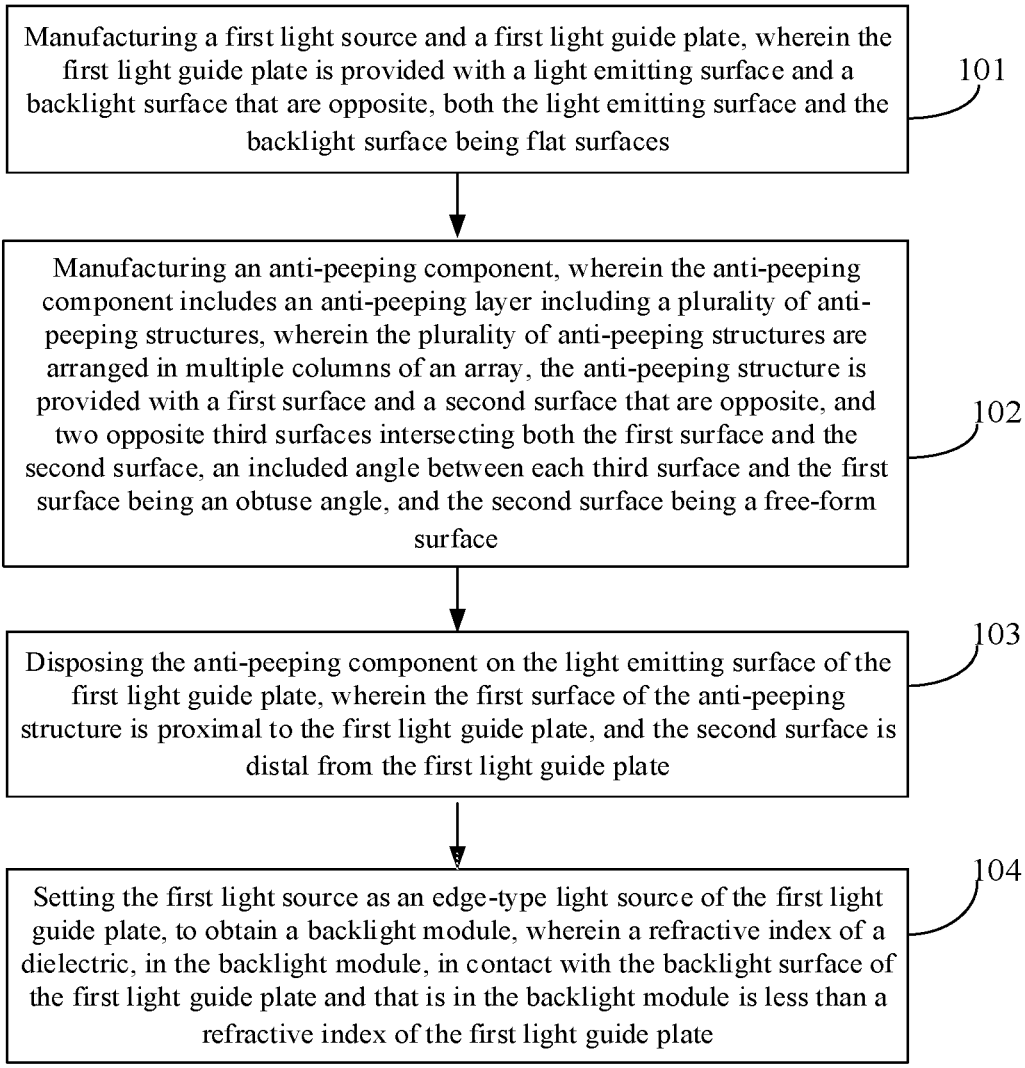
FIG. 11 is a flowchart of a method for manufacturing a backlight module according to an embodiment of the present disclosure.

FIG. 11 is a flowchart of a method for manufacturing a backlight module according to an embodiment of the present disclosure. The method for manufacturing a backlight module may be used for manufacturing the backlight module 0 provided in the foregoing embodiment. Referring FIG. 11, the method includes the following steps.

In step 101, a first light source and a first light guide plate are manufactured, wherein the first light guide plate is provided with a light emitting surface and a backlight surface that are opposite, both the light emitting surface and the backlight surface being flat surfaces.

In step 102, an anti-peeping component is manufactured, wherein the anti-peeping component includes an anti-peeping layer including a plurality of anti-peeping structures, wherein the plurality of anti-peeping structures are arranged in multiple columns of an array, the anti-peeping structure is provided with a first surface and a second surface that are opposite, and two opposite third surfaces intersecting both the first surface and the second surface, an included angle between each third surface and the first surface being an obtuse angle, and the second surface being a free-form surface.

In step 103, the anti-peeping component is disposed on the light emitting surface of the first light guide plate, wherein the first surface of the anti-peeping structure is proximal to the first light guide plate, and the second surface is distal from the first light guide plate.

In step 104, the first light source is set as an edge-type light source of the first light guide plate, to obtain the backlight module, wherein a refractive index of a dielectric, in the backlight module, in contact with the backlight surface of the first light guide plate is less than a refractive index of the first light guide plate.

To sum up, in the method for manufacturing a backlight module provided in this embodiment of the present disclosure, the included angle between the third surface and the first surface of the anti-peeping structure is an obtuse angle, light emitted by the first light source passes through the first surface of the anti-peeping structure, is emitted into the anti-peeping structure, is reflected on the third surface of the anti-peeping structure, then passes through the second surface of the anti-peeping structure, and is emitted out of the anti-peeping component. Therefore, the light emitted out of the anti-peeping structure concentrates to a central region of the second surface of the anti-peeping structure, such that the light emitted out of the backlight module concentrates to a central region of a light emitting surface of the backlight module, thereby reducing a half-brightness angle and a cut-off angle of the backlight module, to implement an anti-peeping mode of the backlight module. Based on the solution provided in this embodiment of the present disclosure, the anti-peeping mode of the backlight module can be implemented without using a PDLC. Therefore, costs and power consumption of the backlight module are relatively low.

Optionally, the anti-peeping component further includes a connection layer; and the step 102 includes:

forming an anti-peeping layer; and forming a connection layer on the anti-peeping layer, wherein the plurality of anti-peeping structures are inlaid in the connection layer.

Optionally, the anti-peeping component further includes a substrate layer;

before forming the anti-peeping layer, the method further includes: forming the substrate layer;

forming the substrate layer includes: forming the anti-peeping layer on the substrate layer; and forming the connection layer on the anti-peeping layer includes: forming the connection layer on the anti-peeping layer, wherein a filling layer is formed on a side, distal from the anti-peeping layer, of the connection layer or is formed on a side, distal from the connection layer, of the anti-peeping layer, and a refractive index of the filling layer is less than the refractive index of the first light guide plate.

Optionally, the method further includes:

manufacturing a second light source and a second light guide plate, wherein the second light guide plate is provided with a light emitting surface and a backlight surface that are opposite, the light emitting surface being a flat surface, and the backlight surface being a dot pattern surface;

disposing the second light guide plate on a side, distal from the anti-peeping component, of the first light guide plate, wherein the light emitting surface of the second light guide plate is proximal to the first light guide plate, the backlight surface of the second light guide plate is distal from the first light guide plate, the dielectric layer is disposed between the first light guide plate and the second light guide plate, and a refractive index of the dielectric layer is less than both the refractive index of the first light guide plate and a refractive index of the second light guide plate; and setting the second light source as an edge-type light source of the second light guide plate.

Optionally, the method further includes:

disposing a side reflective layer on a side surface of the first light guide plate, wherein the side reflective layer is opposite to the first light source; and disposing a bottom reflective layer on the backlight surface of the second light guide plate.

All the above optional technical solutions may be combined in any combination to form an optional embodiment of the present disclosure, which is not repeated in detail herein.

Figure 12:
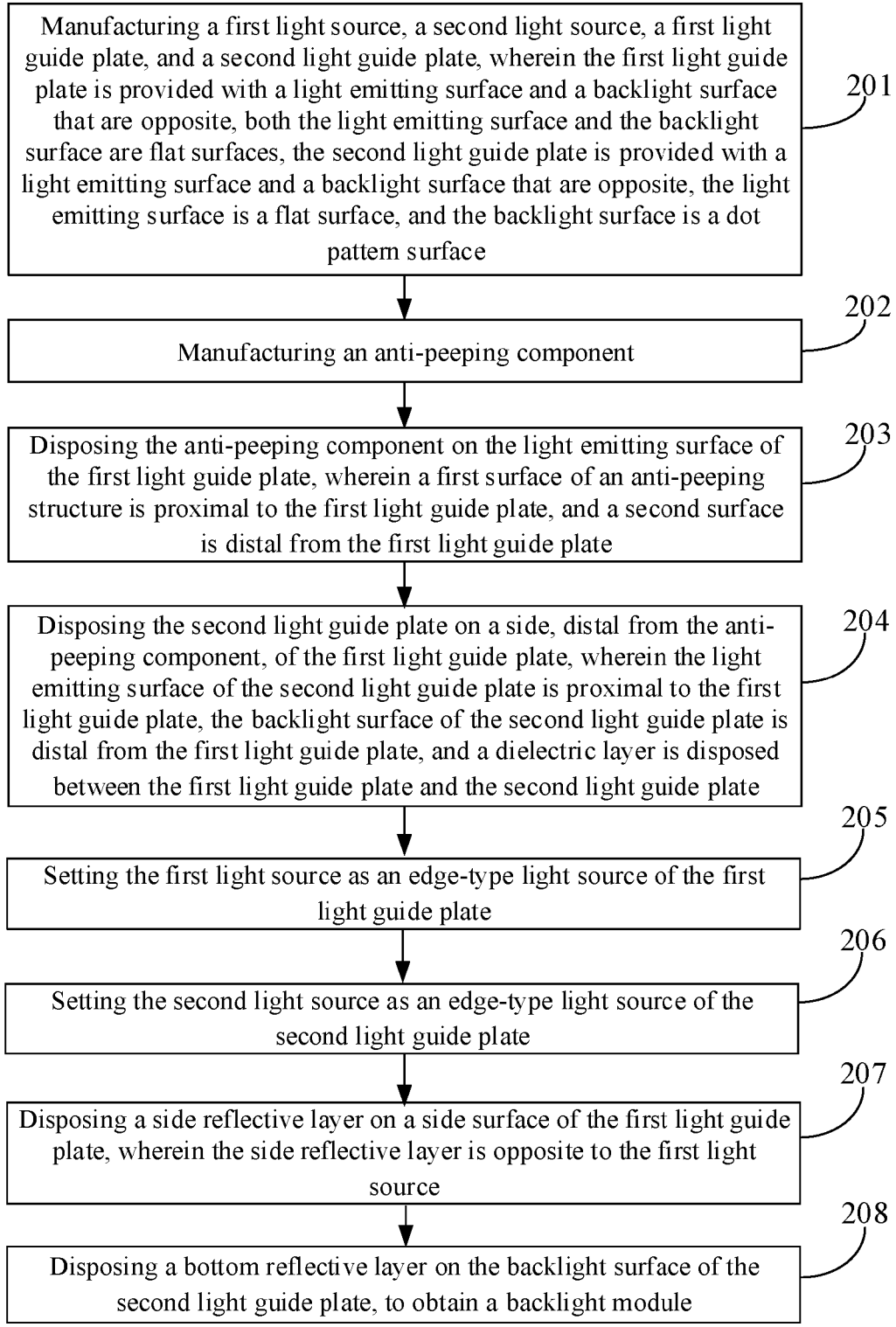
FIG. 12 is a flowchart of another method for manufacturing a backlight module according to an embodiment of the present disclosure.

FIG. 12 is a flowchart of another method for manufacturing a backlight module according to an embodiment of the present disclosure. The method for manufacturing a backlight module may be used for manufacturing the backlight module 0 provided in the foregoing embodiments. Referring FIG. 12, the method includes the following steps.

In step 201, a first light source, a second light source, a first light guide plate, and a second light guide plate are manufactured, wherein the first light guide plate is provided with a light emitting surface and a backlight surface that are opposite, both the light emitting surface and the backlight surface are flat surfaces; the second light guide plate is provided with a light emitting surface and a backlight surface that are opposite, the light emitting surface is a flat surface, and the backlight surface is a dot pattern surface.

Both the first light source and the second light source may be LED light bars, and a material of the first light guide plate may be the same as a material of the second light guide plate. For example, both the material of the first light guide plate and the material of the second light guide plate may be either PMMA or PC. Both the light emitting surface and the backlight surface of the first light guide plate are flat surfaces, the light emitting surface of the second light guide plate is a flat surface, the backlight surface of the second light guide plate is a dot pattern surface, and dots on the dot pattern surface may be circular dots.

In step 202, an anti-peeping component is manufactured.

Optionally, as shown in FIG. 1, FIG. 2, FIG. 5, and FIG. 6, the anti-peeping component 03 includes a substrate layer (shown in none of the figures), and the anti-peeping layer 031 and the connection layer 032 that are sequentially disposed on the substrate layer. The anti-peeping layer 031 includes a plurality of anti-peeping structures 0311, the plurality of anti-peeping structures 0311 are arranged in a plurality of columns of an array. The anti-peeping structure 0311 is provided with a first surface and a second surface that are opposite, and two third surfaces intersecting both the first surface and the second surface, wherein the two third surfaces are opposite, an included angle between each of the third surfaces and the first surface is an obtuse angle, and the second surface is a free-form surface. The structure of the anti-peeping structure may be shown in FIG. 4 and FIG. 5.

Optionally, materials of the substrate layer, the anti-peeping structure 0311, and the connection layer 032 may all be the same as the material of the first light guide plate. For example, the materials of the substrate layer, the anti-peeping structure 0311, and the connection layer 032 may all be PMMA. Manufacturing the anti-peeping component 03 may include: first forming the substrate layer by using PMMA; then forming the anti-peeping layer 031 on the substrate layer, wherein the anti-peeping layer 031 includes the plurality of anti-peeping structures 0311, the first surface of the anti-peeping structure 0311 being in contact with the substrate layer, and the second surface being distal from the substrate layer; and finally forming the connection layer 032 on the anti-peeping layer 031 by using PMMA, such that the anti-peeping structures 0311 are inlaid in the connection layer 032. Forming the anti-peeping layer 031 on the substrate layer may include: forming the plurality of anti-peeping structures 0311 by using PMMA, and then sticking first surfaces of the plurality of anti-peeping structures 0311 onto the substrate layer, to fix the anti-peeping structures 0311 on the substrate layer and obtain the anti-peeping layer 031. In this embodiment of the present disclosure, the first surface of the anti-peeping structure 0311 is provided with a recess region and a flat region, and the flat region of the first surface of the anti-peeping structure 0311 may be attachable on the substrate layer. Optionally, when the anti-peeping structure 0311 is of a strip-shaped structure and the connection layer 032 includes a plurality of connecting strips 0321, after the connection layer 032 is formed on the anti-peeping layer 031, a filling layer may be further formed on a side, distal from the anti-peeping layer 031, of the connection layer 032, or a filling layer may be further formed before the anti-peeping layer 031 is formed. The filling layer is configured to fill grid spaces surrounded by the anti-peeping structure 0311 and the connecting strip 0321. Details are not provided herein in this embodiment of the present disclosure.

Optionally, when the anti-peeping component 03 includes the anti-peeping layer 031 and the connection layer 032, but does not include the substrate layer, the plurality of anti-peeping structures 0311 may be fixed by using the connection layer 032 and second surfaces of the anti-peeping structures 0311, such that the plurality of anti-peeping structures 0311 are arranged in an array to form the anti-peeping component 03, which is not limited in this embodiment of the present disclosure.

In step 203, the anti-peeping component is disposed on the light emitting surface of the first light guide plate, wherein the first surface of the anti-peeping structure is proximal to the first light guide plate, and the second surface is distal from the first light guide plate.

As shown in FIG. 1 and FIG. 2, the anti-peeping component 03 is attachable on the light emitting surface M1 of the first light guide plate 02 by using an optical adhesive, wherein the first surface of the anti-peeping component 03 is proximal to the first light guide plate 03, and the second surface is distal from the first light guide plate 02. Optionally, when the anti-peeping component 03 includes the substrate layer, the substrate layer may be attachable on the light emitting surface M1 of the first light guide plate 02. When the anti-peeping component 03 does not include the substrate layer, the first surface of each anti-peeping structure 0311 of the anti-peeping layer 031 may be attachable on the light emitting surface M1 of the first light guide plate 02. In this embodiment of the present disclosure, the first surface of the anti-peeping structure 0311 is provided with the recess region and the flat region, and the flat region of the first surface of the anti-peeping structure 0311 may be attachable on the light emitting surface M1 of the first light guide plate 02.

In step 204, the second light guide plate is disposed on a side, distal from the anti-peeping component, of the first light guide plate, wherein the light emitting surface of the second light guide plate is proximal to the first light guide plate, the backlight surface of the second light guide plate is distal from the first light guide plate, and a dielectric layer is disposed between the first light guide plate and the second light guide plate.

As shown in FIG. 1 and FIG. 2, a refractive index of the dielectric layer 06 is less than a refractive index of the first light guide plate 02 and less than a refractive index of a second light guide plate 05. The dielectric layer 06 may be a film layer manufactured by a material whose refractive index is less than the refractive index of the first light guide plate 02 and less that the refractive index of the second light guide plate 05. Alternatively, the dielectric layer 06 may be an air layer. Based on different dielectric layers 06, step 204 may include the following two possible implementations.

In a first implementation, the dielectric layer 06 is the film layer manufactured by the material whose refractive index is less than the refractive index of the first light guide plate 02 and less than the refractive index of the second light guide plate 05.

Optionally, the dielectric layer 06 may be formed on the backlight surface M2 of the first light guide plate 02 or the light emitting surface G1 of the second light guide plate 05 by using a material whose refractive index is less than the refractive index of the first light guide plate 02 and less than the refractive index of the second light guide plate 05, and then the backlight surface M2 of the first light guide plate 02 and the light emitting surface G1 of the second light guide plate 05 are fixed (for example, attached), to dispose the second light guide plate 05 on a side, distal from the anti-peeping component 03, of the first light guide plate 02.

In a second implementation, the dielectric layer 06 is the air layer.

Optionally, a support structure is disposed between the backlight surface M2 of the first light guide plate 02 and the light emitting surface G1 of the second light guide plate 05, and the support structure is separately fixed (for example, attached) to the backlight surface M2 of the first light guide plate 02 and the light emitting surface G1 of the second light guide plate 05, to dispose the second light guide plate 05 on a side, distal from the anti-peeping component 03, of the first light guide plate 02. The air layer is disposed between the first light guide plate 02 and the second light guide plate 05. Alternatively, a groove is formed on the backlight surface M2 of the first light guide plate 02 and/or the light emitting surface G1 of the second light guide plate 05, and then the backlight surface M2 of the first light guide plate 02 and the light emitting surface G1 of the second light guide plate 05 are fixed (for example, attached), to dispose the second light guide plate 05 on a side, distal from the anti-peeping component 03, of the first light guide plate 02. A cavity is formed between the first light guide plate 02 and the second light guide plate 05 as the air layer.

In step 205, the first light source is set as an edge-type light source of the first light guide plate.

The first light guide plate may include a side surface intersecting both the light emitting surface and the backlight surface. As shown in FIG. 1, the first light source 01 may be attachable on the side surface of the first light guide plate 02 by using a light bar fixing tape, to set the first light source 01 as the edge-type light source of the first light guide plate 02. The first light source 01 may be an LED light bar, and a length direction of the first light source 01 may be parallel to a length direction of the anti-peeping structure 0311.

In step 206, the second light source is set as an edge-type light source of the second light guide plate.

The second light guide plate may include a side surface intersecting both the light emitting surface and the backlight surface. As shown in FIG. 1, the second light source 04 may be attachable on the side surface of the second light guide plate 05 by using a light bar fixing tape, to set the second light source 04 as the edge-type light source of the second light guide plate 05. The second light source 04 may be an LED light bar, and a length direction of the second light source 04 may be parallel to the length direction of the anti-peeping structure 0311.

In step 207, a side reflective layer is disposed on the side surface of the first light guide plate, wherein the side reflective layer is opposite to the first light source.

As shown in FIG. 1, a side reflective sheet 07 may be attached on a side surface, opposite to the first light source 01, of side surfaces of the first light guide plate 02 by using an optical adhesive, or a reflective film is plated, as a side reflective sheet 07, on a side surface, opposite to the first light source 01, of the side surfaces of the first light guide plate 02, which is not limited in this embodiment of the present disclosure.

In step 208, a bottom reflective layer is disposed on the backlight surface of the second light guide plate, to obtain the backlight module.

As shown in FIG. 1 and FIG. 2, a bottom reflective sheet 08 may be attached on the backlight surface G2 of the second light guide plate 05 by using an optical adhesive, or a reflective film is plated as a bottom reflective sheet 08 on the backlight surface G2 of the second light guide plate 05, which is not limited in this embodiment of the present disclosure.

A person skilled in the art can easily understand that the sequence of steps of the method for manufacturing a backlight module provided in the embodiments of the present disclosure may be adjusted appropriately, and steps may also be increased or decreased according to the situation. Within the technical scope disclosed in the present disclosure, any varied method that is easily conceivable for a person skilled in the art should fall within in the protection scope of the present disclosure, which is not described again.

To sum up, in the method for manufacturing a backlight module provided in this embodiment of the present disclosure, the included angle between the third surface and the first surface of the anti-peeping structure is an obtuse angle, light emitted by the first light source passes through the first surface of the anti-peeping structure, is emitted into the anti-peeping structure, is reflected on the third surface of the anti-peeping structure, then passes through the second surface of the anti-peeping structure, and is emitted out of the anti-peeping component. Therefore, the light emitted out of the anti-peeping structure concentrates to a central region of the second surface of the anti-peeping structure, such that the light emitted out of the backlight module concentrates to a central region of a light emitting surface of the backlight module, thereby reducing a half-brightness angle and a cut-off angle of the backlight module, to implement an anti-peeping mode of the backlight module. Optionally, the light emitted by the second light source passes through the anti-peeping structures and a region between each adjacent anti-peeping structures and is emitted out of the anti-peeping component, such that an half-brightness angle and a cut-off angle of the light emitted from the anti-peeping component are relatively large. Therefore, the backlight module is in a sharing mode. Based on the solution provided in this embodiment of the present disclosure, the anti-peeping mode of the backlight module and switching between the anti-peeping mode and the sharing mode can be implemented without using a PDLC. Therefore, costs and power consumption of the backlight module are relatively low.

Figure 13:
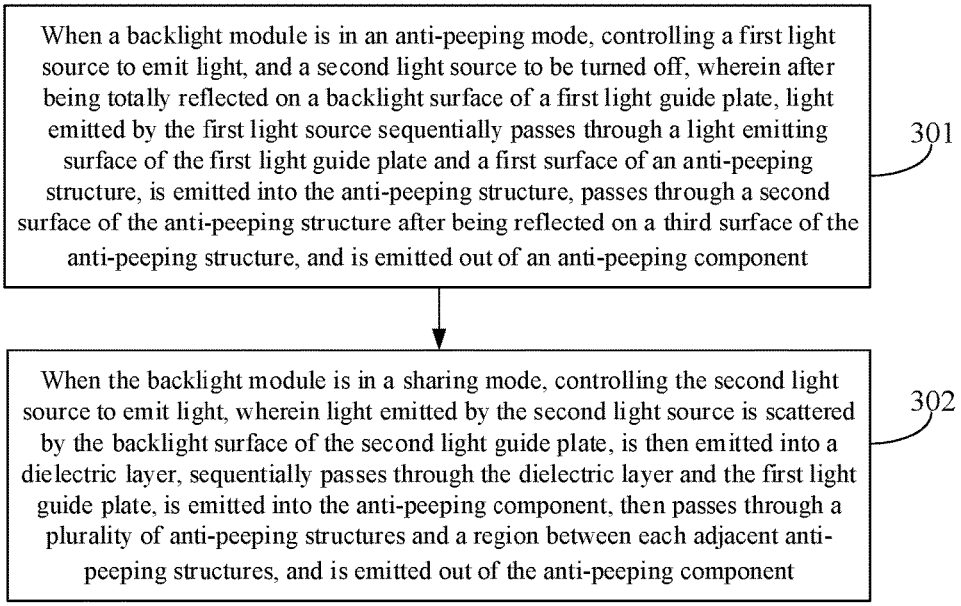
FIG. 13 is a flowchart of a method for controlling a backlight module according to an embodiment of the present disclosure.

FIG. 13 is a flowchart of a method for controlling a backlight module according to an embodiment of the present disclosure. The method for controlling a backlight module may be used for controlling the backlight module shown in FIG. 1, FIG. 2, FIG. 5, or FIG. 6. Referring to FIG. 13, the method includes the following steps.

In step 301, when the backlight module is in an anti-peeping mode, a first light source is controlled to emit light, and a second light source is controlled to be turned off, wherein after being totally reflected on a backlight surface of a first light guide plate, light emitted by the first light source sequentially passes through a light emitting surface of the first light guide plate and a first surface of the anti-peeping structure, is emitted into the anti-peeping structure, passes through a second surface of the anti-peeping structure after being reflected on a third surface of the anti-peeping structure, and is emitted out from an anti-peeping component.

Optionally, the backlight module may include a control component. Referring to FIG. 7 and FIG. 8, when the backlight module 0 is in the anti-peeping mode, the control component controls the first light source 01 to emit light, and the second light source 04 to be turned off. Light emitted by the first light source 01 is propagated in the first light guide plate 02. In a process of propagating the light in the first light guide plate 02, after encountering a second region of the light emitting surface M1 of the first light guide plate 02, total reflection of the light in the first light guide plate 02 is broke, and the light sequentially passes the second region of the light emitting surface M1 of the first light guide plate 02 and a convex region of the first surface of the anti-peeping structure 031, is propagated in the anti-peeping structure 031, and is then emitted out from the second surface of the anti-peeping structure 031. In the process of propagating the light in the anti-peeping structure 031, the anti-peeping structure 031 may adjust the light, such that the light emitted from the second surface of the anti-peeping structure 031 turns into small-angle light. Therefore, the backlight module is in the anti-peeping mode.

In step 302, when the backlight module is in a sharing mode, the second light source is controlled to emit light, wherein light emitted by the second light source is scattered by a backlight surface of a second light guide plate, is then emitted into a dielectric layer, sequentially passes through the dielectric layer and the first light guide plate, is emitted into the anti-peeping component, then passes through a plurality of anti-peeping structures and a region between each adjacent anti-peeping structures, and is emitted out of the anti-peeping component.

Optionally, the backlight module may include a control component. Referring to FIG. 7 and FIG. 8, when the backlight module 0 is in the sharing mode, the control component controls the second light source 04 to emit light. Light emitted by the second light source 04 is propagated in the second light guide plate 05. When encountering dots on the backlight surface G2, the light is scattered by the backlight surface G2 of the second light guide plate 05, sequentially passes through the light emitting surface G1 of the second light guide plate 05, the dielectric layer 06, and the first light guide plate 02 after being reflected by a bottom reflective layer 08, is emitted into the anti-peeping component 03, passes through the anti-peeping structures 0311 and the region between adjacent anti-peeping structures 0311, and is emitted from the anti-peeping component 03. Since the light is scattered by the backlight surface G2 of the second light guide plate 05, the light emitted from the anti-peeping component 03 is stray light with a relatively large angle. Therefore, the backlight module is in the anti-peeping mode.

Optionally, the method further includes: when the backlight module is in the sharing mode, controlling a first light source to emit light, wherein after being totally reflected on the backlight surface of the first light guide plate, light emitted by the first light source sequentially passes through the light emitting surface of the first light guide plate and the first surface of the anti-peeping structure, and is emitted into the anti-peeping structure; and after being reflected on the third surface of the anti-peeping structure, the light passes through the second surface of the anti-peeping structure and is emitted out from an anti-peeping component.

Controlling the first light source to emit light and the process of propagating the light emitted by the first light source may be referenced to step 301, which is not described herein. In this embodiment of the present disclosure, when the backlight module is in the sharing mode, the first light source and the second light source may be controlled to simultaneously emit light, such that the backlight module has relatively high brightness.

To sum up, based on the method for controlling a backlight module provided in this embodiment of the present disclosure, an included angle between the third surface and the first surface of the anti-peeping structure of the backlight module is an obtuse angle, the light emitted by the first light source passes through the first surface of the anti-peeping structure, is emitted into the anti-peeping structure, is reflected on the third surface of the anti-peeping structure, then passes through the second surface of the anti-peeping structure, and is emitted out of the anti-peeping component. Therefore, the light emitted out of the anti-peeping structure concentrates to a central region of the second surface of the anti-peeping structure, such that the light emitted out of the backlight module concentrates to a central region of a light emitting surface of the backlight module, thereby reducing a half-brightness angle and a cut-off angle of the backlight module, to implement the anti-peeping mode of the backlight module. Optionally, the light emitted by the second light source passes through the anti-peeping structures and the region between adjacent anti-peeping structures of the plurality of anti-peeping structures and is emitted out of the anti-peeping component, such that an half-brightness angle and a cut-off angle of the light emitted from the anti-peeping component are relatively large. Therefore, the backlight module is in the sharing mode. Based on the solution provided in this embodiment of the present disclosure, the anti-peeping mode of the backlight module and switching between the anti-peeping mode and the sharing mode can be implemented without using a PDLC. Therefore, costs and power consumption of the backlight module are relatively low.

Figure 14:
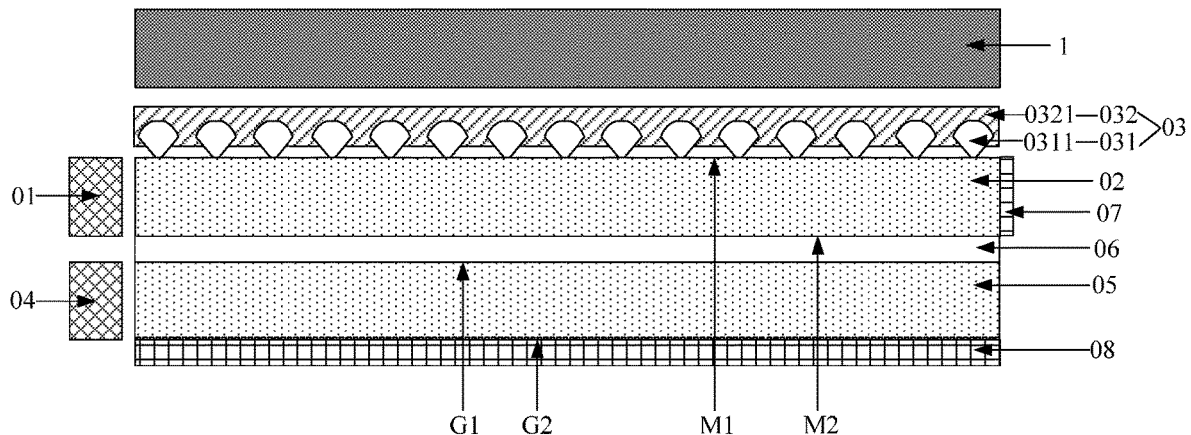
FIG. 14 is a schematic structural diagram of a display apparatus according to an embodiment according to the present disclosure.

FIG. 14 is a schematic structural diagram of a display apparatus according to an embodiment of the present disclosure. Referring to FIG. 14, the display apparatus includes a display panel 1 and the backlight module 0 provided in the foregoing embodiment. The display panel 1 is disposed on a light emitting side of the backlight module 0. A structure of the backlight module 0 may be referenced to the descriptions of the foregoing embodiment. The display panel 1 may be a liquid crystal panel, and includes structures, such as an array substrate (not shown in FIG. 14) formed through meshing together, a color film substrate (not shown in FIG. 14), and a liquid crystal layer (not shown in FIG. 14) disposed between the array substrate and the color film substrate. Details are not described herein.

Optionally, the display apparatus provided in this embodiment of the present disclosure may be a wearable device such as a watch or a wristband, or a mobile terminal such as a mobile phone or a tablet computer, or any product or part with a display function, such as a television, a display, a notebook computer, a digital photo frame, or a navigator.

To sum up, based on the display apparatus provided in this embodiment of the present disclosure, an included angle between a third surface and a first surface of an anti-peeping structure of the backlight module is an obtuse angle, light emitted by a first light source passes through the first surface of the anti-peeping structure, is emitted into the anti-peeping structure, is reflected on the third surface of the anti-peeping structure, then passes through a second surface of the anti-peeping structure, and is emitted out of an anti-peeping component. Therefore, the light emitted out of the anti-peeping structure concentrates to a central region of the second surface of the anti-peeping structure, such that the light emitted out of the backlight module concentrates to a central region of a light emitting surface of the backlight module, thereby reducing a half-brightness angle and a cut-off angle of the backlight module, to implement an anti-peeping mode of the backlight module. Based on the solution provided in this embodiment of the present disclosure, the anti-peeping mode of the backlight module can be implemented without using a PDLC. Therefore, costs and power consumption of the backlight module are relatively low, such that costs and power consumption of the display apparatus are relatively low.

The display apparatus provided in this embodiment of the present disclosure may be applied to the following method. For the method and principle for controlling the display apparatus in the embodiments of the present disclosure may be referenced to descriptions in the following embodiments.

Figure 15:
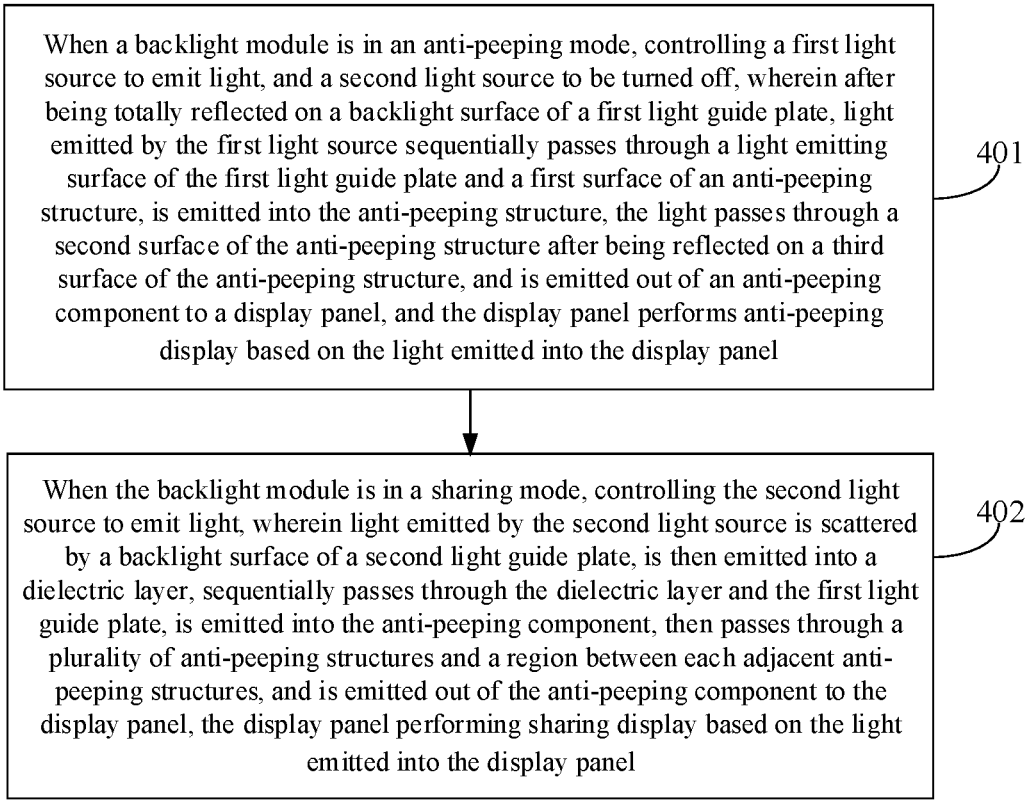
FIG. 15 is a flowchart of a method for controlling a display apparatus according to an embodiment of the present disclosure.

FIG. 15 is a flowchart of a method for controlling a display apparatus according to an embodiment of the present disclosure. The method for controlling a display apparatus may be used for controlling the display apparatus shown in FIG. 14. Referring to FIG. 15, the method includes the following steps.

In step 401, when a backlight module is in an anti-peeping mode, a first light source is controlled to emit light, and a second light source is controlled to be turned off, wherein after being totally reflected on a backlight surface of a first light guide plate, light emitted by the first light source sequentially passes through a light emitting surface of the first light guide plate and a first surface of an anti-peeping structure and is emitted into the anti-peeping structure; and after being reflected on a third surface of the anti-peeping structure, the light passes through a second surface of the anti-peeping structure, and is emitted out from an anti-peeping component to a display panel, wherein the display panel performs anti-peeping display based on the light emitted into the display panel.

Referring to FIG. 14 and with reference to FIG. 7 and FIG. 8, when the backlight module 0 is in the anti-peeping mode, a control component controls the first light source 01 to emit light, and the second light source 04 to be turned off. The light emitted by the first light source 01 is propagated in the first light guide plate 02. In a process of propagating the light in the first light guide plate 02, after encountering a second region of the light emitting surface M1 of the first light guide plate 02, total reflection of the light in the first light guide plate 02 is broke, and the light sequentially passes the second region of the light emitting surface M1 of the first light guide plate 02 and a flat region of the first surface of the anti-peeping structure 031, is emitted into the anti-peeping structure 031, is propagated in the anti-peeping structure 031, and is then emitted out from the second surface of the anti-peeping structure 031 into the display panel 1. The display panel 1 performs display based on the light emitted into the display panel 1. In the process of propagating the light in the anti-peeping structure 031, the anti-peeping structure 031 may adjust the light, such that the light emitted from the second surface of the anti-peeping structure 031 turns into small-angle light, such that the display panel 1 performs anti-peeping display based on the light emitted into the display panel 1.

In step 402, when the backlight module is in a sharing mode, the second light source is controlled to emit light, wherein light emitted by the second light source is scattered by a backlight surface of the second light guide plate and is then emitted into a dielectric layer, sequentially passes through the dielectric layer and the first light guide plate, is emitted into the anti-peeping component, passes through a plurality of anti-peeping structures and a region between each adjacent anti-peeping structures, and is emitted out from the anti-peeping component to the display panel, the display panel performing sharing display based on the light emitted into the display panel.

Referring to FIG. 14 and in conjunction with FIG. 7 and FIG. 8, when the backlight module 0 is in the sharing mode, a control component controls the second light source 04 to emit light. The light emitted by the second light source 04 is propagated in the second light guide plate 05. When encountering dots on the backlight surface G2, the light is scattered by the backlight surface G2 of the second light guide plate 05, sequentially passes through a light emitting surface G1 of the second light guide plate 05, a dielectric layer 06, and the first light guide plate 02 after being reflected by a bottom reflective layer 08, is emitted into the anti-peeping component 03, passes through the anti-peeping structures 0311 and a region between each adjacent anti-peeping structures 0311, and is emitted out of the anti-peeping component 03 to the display panel 1. The display panel 1 performs display based on the light emitted into the display panel. Since the light is scattered by the backlight surface G2 of the second light guide plate 05, the light emitted into the display panel 1 is stray light with a relatively large angle, such that the display panel 1 performs sharing display based on the light emitted into the display panel 1.

Optionally, the method further includes: when the backlight module is in the sharing mode, controlling a first light source to emit light, wherein after being totally reflected on the backlight surface of the first light guide plate, light emitted by the first light source sequentially passes through the light emitting surface of the first light guide plate and the first surface of the anti-peeping structure, and is emitted into the anti-peeping structure; and after being reflected on the third surface of the anti-peeping structure, the light passes through the second surface of the anti-peeping structure and is emitted out from the anti-peeping component to the display panel. The display panel performs sharing display based on the light emitted into the display panel. In this embodiment of the present disclosure, when the backlight module is in the sharing mode, the first light source and the second light source can be controlled to simultaneously emit light, such that the backlight module is provided with relatively high brightness, thereby helping the display panel to implement high-brightness display.

To sum up, in the method for controlling a display apparatus according to this embodiment of the present disclosure, an included angle between the third surface and the first surface of the anti-peeping structure of the backlight module is an obtuse angle, the light emitted by the first light source passes through the first surface of the anti-peeping structure, is emitted into the anti-peeping structure, is reflected on the third surface of the anti-peeping structure, then passes through the second surface of the anti-peeping structure, and is emitted out of the anti-peeping component. Therefore, the light emitted out of the anti-peeping structure concentrates to a central region of the second surface of the anti-peeping structure, such that the light emitted out of the backlight module concentrates to a central region of a light emitting surface of the backlight module, thereby reducing a half-brightness angle and a cut-off angle of the backlight module, to implement the anti-peeping mode of the backlight module. Optionally, the light emitted by the second light source passes through the anti-peeping structures and the region between adjacent anti-peeping structures and is emitted out of the anti-peeping component, such that an half-brightness angle and a cut-off angle of the light emitted from the anti-peeping component are relatively large. Therefore, the backlight module is in the sharing mode. Based on the solution provided in this embodiment of the present disclosure, the anti-peeping mode of the backlight module and switching between the anti-peeping mode and the sharing mode can be implemented without using a PDLC. Therefore, costs and power consumption of the backlight module are relatively low, such that costs and power consumption of the display apparatus are relatively low.

In the present disclosure, the terms "and/or" merely describes the association relationship between the associated objects and indicates that there may be three relationships. For example, A and/or B may indicate three cases where only A exists, A and B exist at the same time, or only B exists. In addition, the character "/" in this specification generally indicates that the related objects are in an "or" relationship.

In the present disclosure, the terms "first" and "second" are used only for description and shall not be interpreted as indication or implication of relative importance. The term "a plurality of" means two or more than two, unless otherwise specifically defined.

It may be understood by a person of ordinary skill in the art that all or a part of the steps of implementing the embodiments described above may be accomplished by hardware or may also be accomplished by programs instructing related hardware. The programs are stored in a computer-readable storage medium, and the storage medium mentioned may be a read-only memory, a magnetic disk, an optical disk, or the like.

The foregoing is only optional embodiments of the present disclosure and is not intended to limit the present disclosure, and any modifications, equivalent substitutions, improvements and the like within the spirit and principles of the present disclosure shall fall within the protection scope of the present disclosure.

What is claimed is:

1. A backlight module; comprising:
   a first light source, a first light guide plate, and an anti-peeping component; wherein
   the first light source is an edge-type light source of the first light guide plate;
   the first light guide plate is provided with a light emitting surface and a backlight surface that are opposite, wherein both the light emitting surface and the backlight surface are flat surfaces, and the anti-peeping component is on the light emitting surface of the first light guide plate; and
   the anti-peeping component comprises an anti-peeping layer comprising a plurality of anti-peeping structures, wherein the plurality of anti-peeping structures are arranged in multiple columns of an array, the anti-peeping structure is provided with a first surface proximal to the first light guide plate, a second surface distal from the first light guide plate, and two opposite third surfaces intersecting both the first surface and the second surface, an included angle between the third surface and the first surface being an obtuse angle, and the second surface being a free-form surface;
   wherein the backlight module further comprises: a second light source, a second light guide plate, and a dielectric layer; wherein
   the second light source is an edge-type light source of the second light guide plate;
   the second light guide plate is provided with a light emitting surface and a backlight surface that are opposite, wherein the light emitting surface is a flat surface, the backlight surface is a dot pattern surface, the second light guide plate is on a side, distal from the anti-peeping component, of the first light guide plate, the light emitting surface of the second light guide plate is proximal to the first light guide plate, and the backlight surface of the second light guide plate is distal from the first light guide plate; and the dielectric layer is between the first light guide plate and the second light guide plate and a refractive index of the dielectric layer is less than both the refractive index of the first light guide plate and a refractive index of the second light guide plate.

2. The backlight module according to claim 1, wherein the first surface satisfies one of the following:

the first surface is provided with a recess region and a flat region; and the first surface is provided with a plurality of recess regions and a plurality of flat regions, so that the first surface is a serrated surface.

3. The backlight module according to claim 1, wherein the anti-peeping structure is further provided with two parallel end surfaces, wherein the end surfaces are in contact with each of the first surface, the second surface, and the two third surfaces.

4. The backlight module according to claim 1, wherein the anti-peeping structure satisfies one of the following:

the anti-peeping structure is strip-shaped, and each column of the anti-peeping layer is provided with one of the anti-peeping structures; and the anti-peeping structure is block-shaped, and each column of the anti-peeping layer is provided with a plurality of the anti-peeping structures.

5. The backlight module according to claim 1, wherein the anti-peeping component further comprises: a connection layer on the anti-peeping layer, wherein the plurality of anti-peeping structures are inlaid in the connection layer.

6. The backlight module according to claim 5, wherein the anti-peeping structure is strip-shaped, and the connection layer comprises a plurality of connecting strips extending in a same direction, wherein the plurality of connecting strips are arranged in an array, each of the connecting strips intersecting the plurality of anti-peeping structures.

7. The backlight module according to claim 6, wherein the first surface is provided with a recess region and a flat region, and orthographic projections of the connecting strips on the anti-peeping layer fall within the recess region.

8. The backlight module according to claim 5, wherein the anti-peeping component further comprises: a filling layer, wherein the filling layer is on one of the position:

a side, distal from the anti-peeping layer, of the connection layer, and a side, distal from the connection layer, of the anti-peeping layer;

a refractive index of the filling layer is less than the refractive index of the first light guide plate.

9. The backlight module according to claim 8, wherein the anti-peeping component further comprises: a substrate layer, wherein the anti-peeping layer and the connection layer are sequentially on the substrate layer, the substrate layer is attachable on the light emitting surface of the first light guide plate by an optical adhesive, and refractive indexes of the substrate layer, the optical adhesive, and the first light guide plate are equal.

10. The backlight module according to claim 1, wherein the backlight module further comprises:

a side reflective layer on a side surface of the first light guide plate, wherein the side reflective layer is opposite to the first light source; and a bottom reflective layer on the backlight surface of the second light guide plate.

11. A method for manufacturing a backlight module, comprising:

manufacturing a first light source and a first light guide plate, wherein the first light guide plate is provided with a light emitting surface and a backlight surface that are opposite, both the light emitting surface and the backlight surface being flat surfaces;

manufacturing an anti-peeping component, wherein the anti-peeping component comprises an anti-peeping layer comprising a plurality of anti-peeping structures, wherein the plurality of anti-peeping structures are arranged in a multiple columns of an array, the anti-peeping structure is provided with a first surface and a second surface that are opposite, and two opposite third surfaces intersecting both the first surface and the second surface, an included angle between the third surface and the first surface being an obtuse angle, and the second surface being a free-form surface;

disposing the anti-peeping component on the light emitting surface of the first light guide plate, wherein the first surface of the anti-peeping structure is proximal to the first light guide plate, and the second surface is distal from the first light guide plate;

setting the first light source as an edge-type light source of the first light guide plate to obtain the backlight module;

manufacturing a second light source and a second light guide plate, wherein the second light guide plate is provided with a light emitting surface and a backlight surface that are opposite, the light emitting surface being a flat surface, and the backlight surface being a dot pattern surface;

disposing the second light guide plate on a side, distal from the anti-peeping component, of the first light guide plate, wherein the light emitting surface of the second light guide plate is proximal to the first light guide plate, the backlight surface of the second light guide plate is distal from the first light guide plate, a dielectric layer is between the first light guide plate and the second light guide plate, and a refractive index of the dielectric layer is less than both the refractive index of the first light guide plate and a refractive index of the second light guide plate; and setting the second light source as an edge-type light source of the second light guide plate.

12. The method according to claim 11, wherein the anti-peeping component further comprises a connection layer; and manufacturing the anti-peeping component comprises:

forming an anti-peeping layer; and forming the connection layer on the anti-peeping layer, wherein the plurality of anti-peeping structures are inlaid into the connection layer.

13. The method according to claim 12, wherein the anti-peeping component further comprises a substrate layer;

before forming the anti-peeping layer, the method further comprises: forming the substrate layer;

forming the anti-peeping layer comprises: forming the anti-peeping layer on the substrate layer, wherein the first surface of the anti-peeping structure is in contact with the substrate layer, and the second surface is distal from the substrate layer; and forming the connection layer on the anti-peeping layer comprises: forming the connection layer on the anti-peeping layer, wherein a filling layer is formed on one of the position: a side, distal from the anti-peeping layer, of the connection layer, and a side, distal from the connection layer, of the anti-peeping layer; a refractive index of the filling layer is less than the refractive index of the first light guide plate.

14. The method according to claim 11, wherein the method further comprises:
disposing a side reflective layer on a side surface of the first light guide plate, wherein the side reflective layer is opposite to the first light source; and
disposing a bottom reflective layer on the backlight surface of the second light guide plate.

15. A method for controlling a backlight module, applicable to the backlight module as defined in claim 1, the method comprising:
controlling, when the backlight module is in an anti-peeping mode, the first light source to emit light; wherein after being totally reflected on the backlight surface of the first light guide plate, the light emitted by the first light source sequentially passes through the light emitting surface of the first light guide plate and the first surface of the anti-peeping structure, and is emitted into the anti-peeping structure; and after being reflected on the third surface of the anti-peeping structure, the light passes through the second surface of the anti-peeping structure and is emitted out of the anti-peeping component.

16. The method according to claim 15, wherein the method further comprises:
controlling, when the backlight module is in an anti-peeping mode, a second light source to be turned off; and
controlling, when the backlight module is in a sharing mode, the second light source to emit light, wherein light emitted by the second light source is scattered by the backlight surface of a second light guide plate, is then emitted into a dielectric layer, sequentially passes through the dielectric layer and the first light guide plate to emit into the anti-peeping component, then passes through the plurality of anti-peeping structures and a region between each adjacent anti-peeping structures, and is emitted out of the anti-peeping component.

17. The method according to claim 15, wherein the method further comprises:
controlling, when the backlight module is in the sharing mode, the first light source to emit light, wherein after being totally reflected on the backlight surface of the first light guide plate, light emitted by the first light source sequentially passes through the light emitting surface of the first light guide plate and the first surface of the anti-peeping structure, and is then emitted into the anti-peeping structure; and after being reflected on the third surface of the anti-peeping structure, the light passes through the second surface of the anti-peeping structure and is emitted out of the anti-peeping component.

18. A display apparatus, comprising a display panel and the backlight module as defined in claim 1.

* * * * *